United States Patent [19]

Fehr et al.

[11] Patent Number: 5,301,847

[45] Date of Patent: Apr. 12, 1994

[54] PASTE PUMP WITH AN ADJUSTABLE STROKE PISTON

[76] Inventors: Amos Fehr; Joseph Chong, both of 4572 Erie Avenue, Niagara Falls, Ontario, L2E 3N3, Canada
(Filed Under 37 CFR 1.47(a))

[21] Appl. No.: 727,000

[22] Filed: Jul. 8, 1991

Related U.S. Application Data

[63] Continuation of Ser. No. 639,421, Jan. 10, 1991, abandoned.

[51] Int. Cl.$^5$ .............................................. G01F 11/06
[52] U.S. Cl. .................................... 222/309; 222/334
[58] Field of Search ..................... 222/309, 334, 380

[56] References Cited

U.S. PATENT DOCUMENTS

| | | | |
|---|---|---|---|
| 2,032,163 | 2/1936 | Bagby | 222/309 X |
| 2,765,601 | 10/1956 | Anderson | 222/309 X |
| 2,792,156 | 5/1957 | Camp | 222/309 |
| 3,276,487 | 10/1966 | Miller et al. | 222/309 X |
| 3,341,076 | 9/1967 | Wasilewski et al. | 222/309 |
| 3,385,479 | 5/1968 | Austin, Jr. et al. | 222/334 X |
| 4,234,107 | 11/1980 | Gernlein | 222/309 |

FOREIGN PATENT DOCUMENTS 599773  4/1948  United Kingdom ................ 222/309

*Primary Examiner*—Gregory L. Huson
*Assistant Examiner*—Kenneth Bomberg
*Attorney, Agent, or Firm*—Sim & McBurney

[57] ABSTRACT

Improvements are provided in a food paste pump, e. g. a tomato paste pump, or an egg mixture paste pump, for an apparatus for the making of an overlapped-folded, filled, rolled, food product. That apparatus includes a supporting frame structure, and a conveyor system supported thereon, the conveyor system passing a plurality of work stations. Intermittent moving means are provided for intermittently moving the conveyor system from one work station to the next work station downstream therefrom. The work stations include a sheet of dough feeding mechanism; a foodstuff loading mechanism; a sheet of dough folding mechanism; a folded sheet of dough rolling mechanism; discharge means; and control means to synchronize the intermittent movement of the conveyor system with the sequential operation of all the above-described mechanisms. At the foodstuff loading mechanism, a pair of the novel food paste pumps is provided. Each pump includes a metering cylinder provided with a T-shaped passage with inflow by means of a combination of gravity flow and suction, and discharge by means of pressure by a pump plunger. Control of the volume of food paste discharged is also provided. The discharge of the food paste is directed to particularly recited work stations.

7 Claims, 29 Drawing Sheets

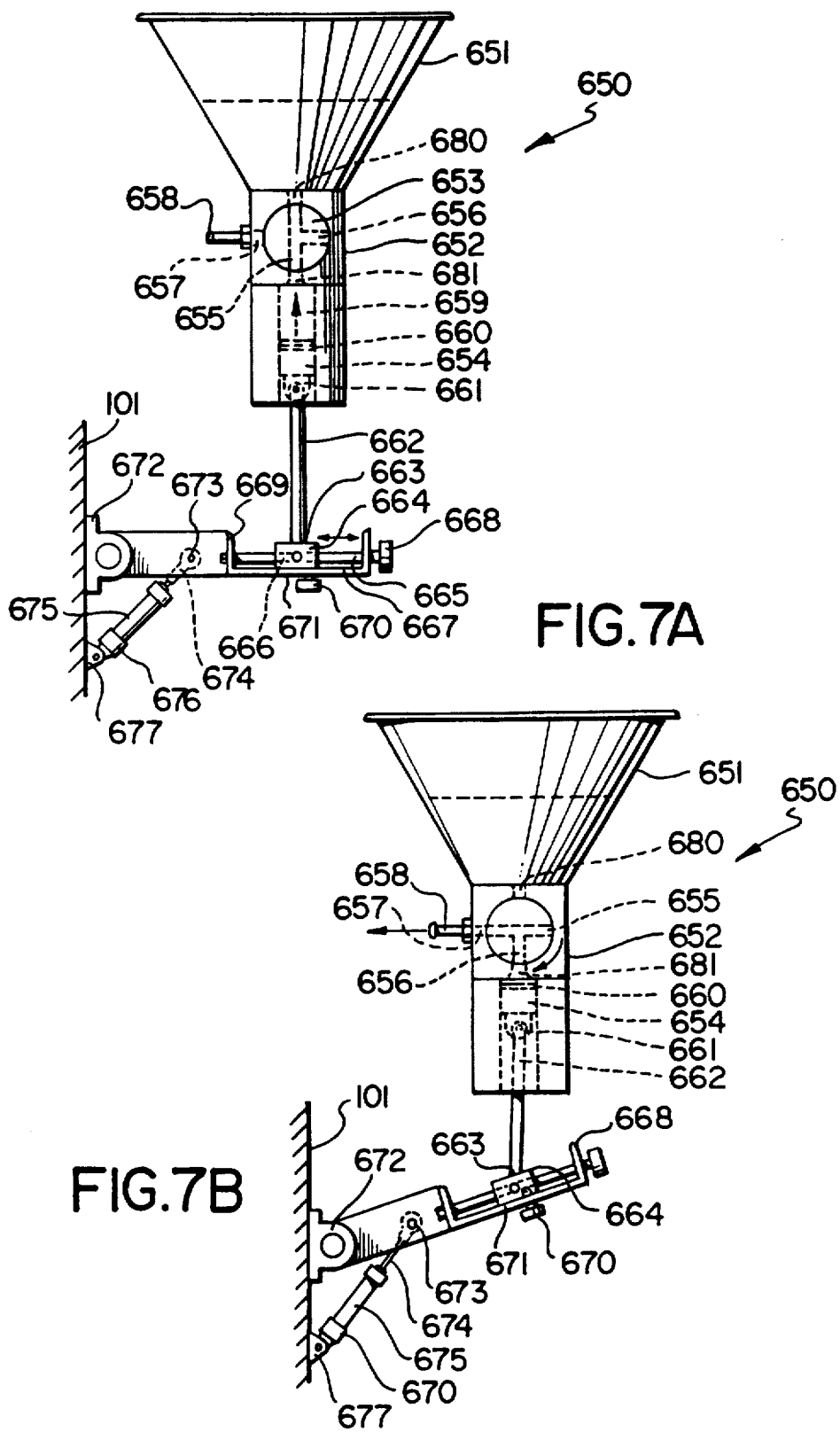

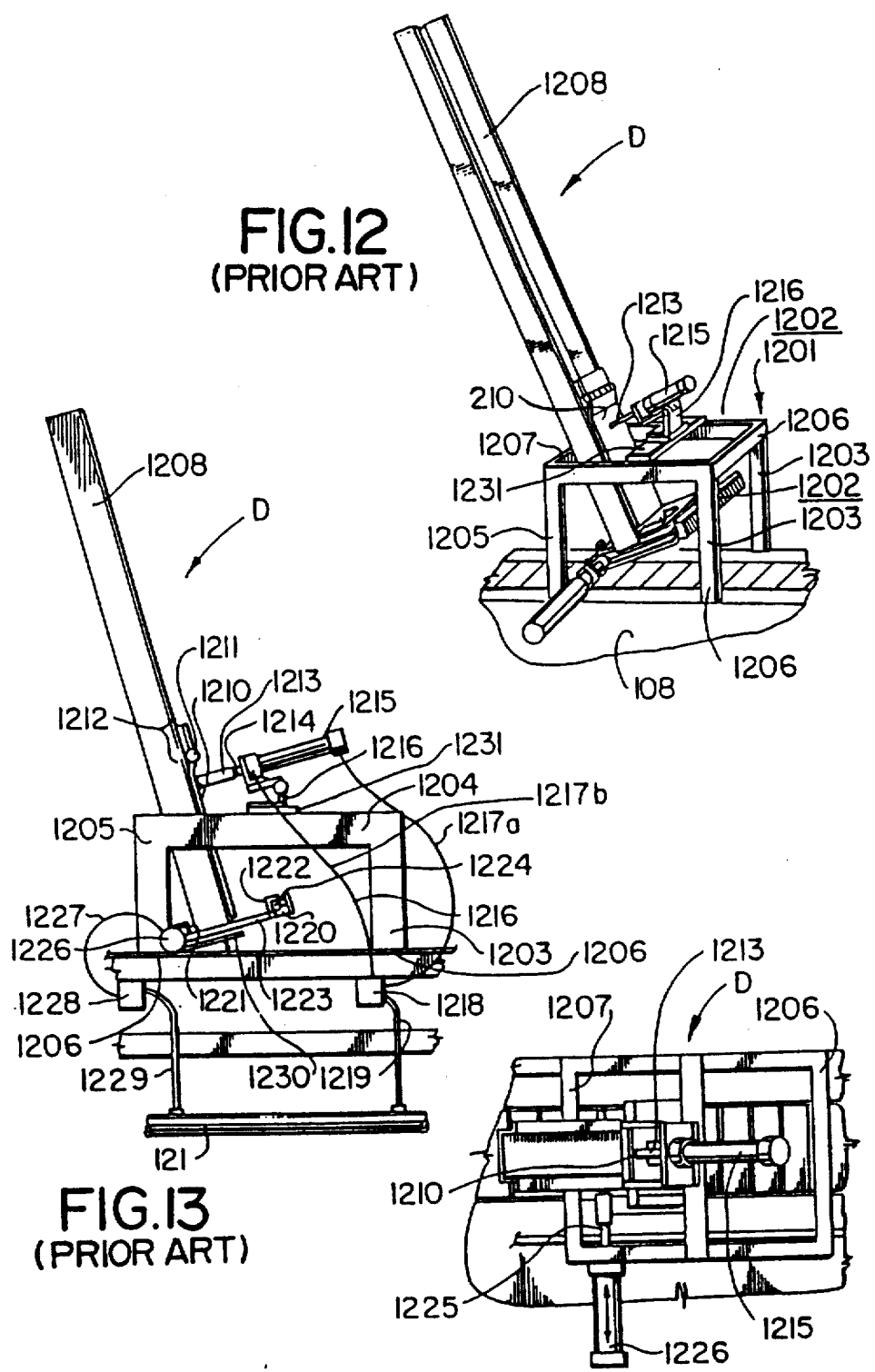

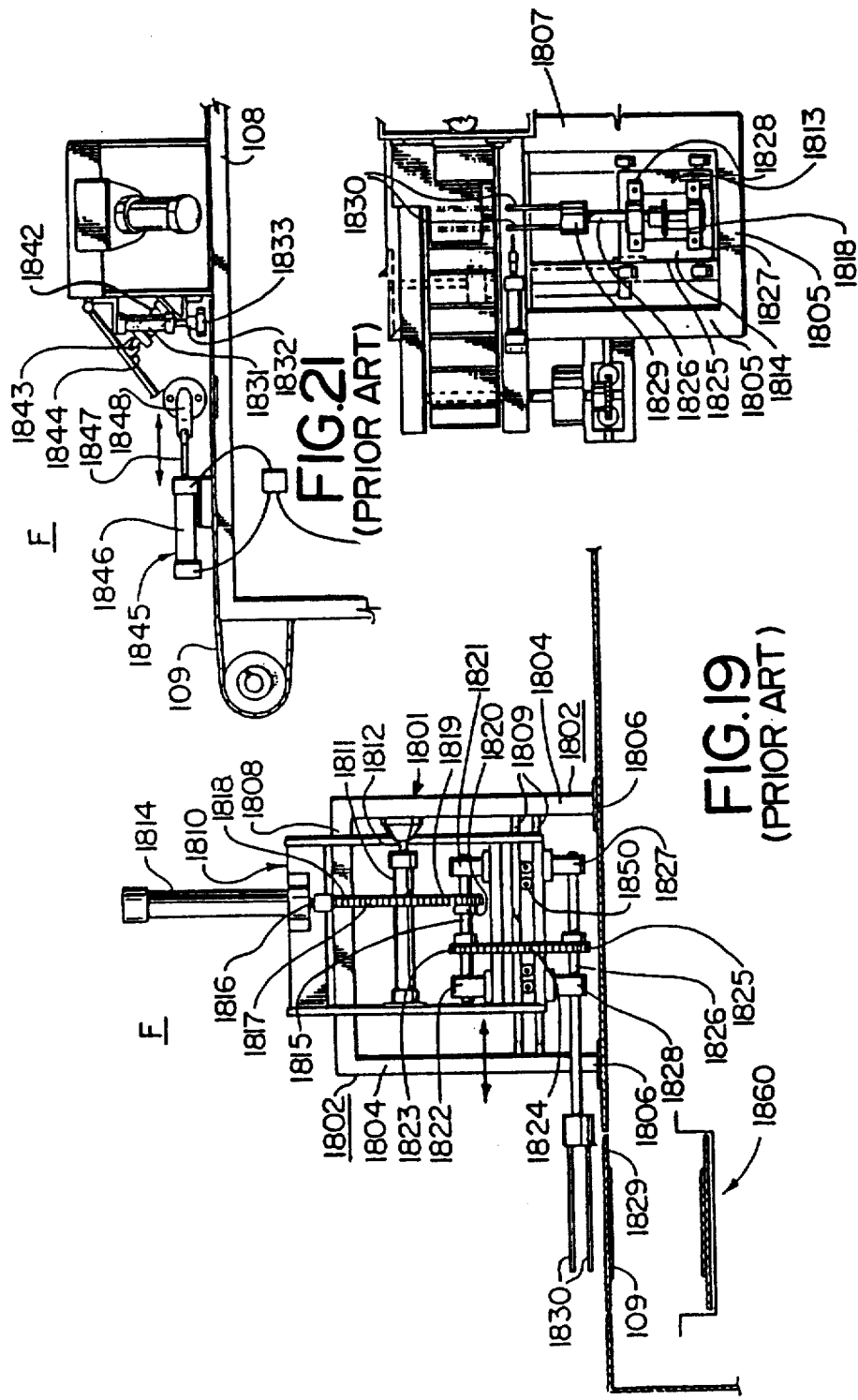

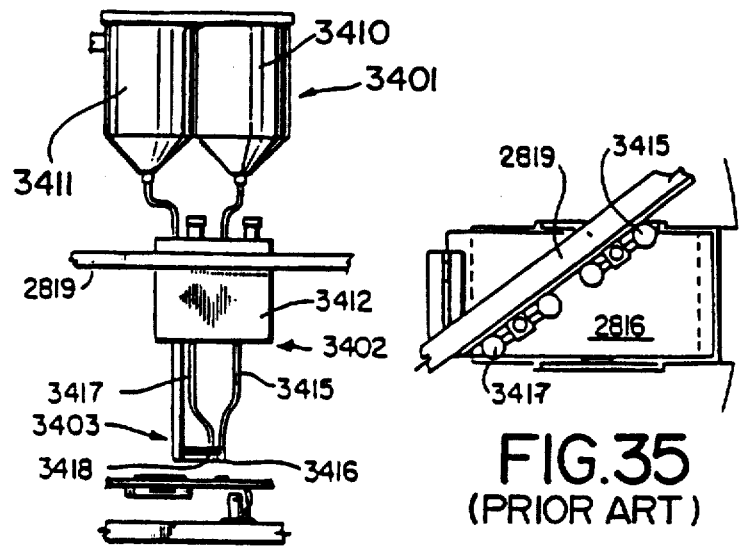
FIG. 34 (PRIOR ART)
FIG. 35 (PRIOR ART)
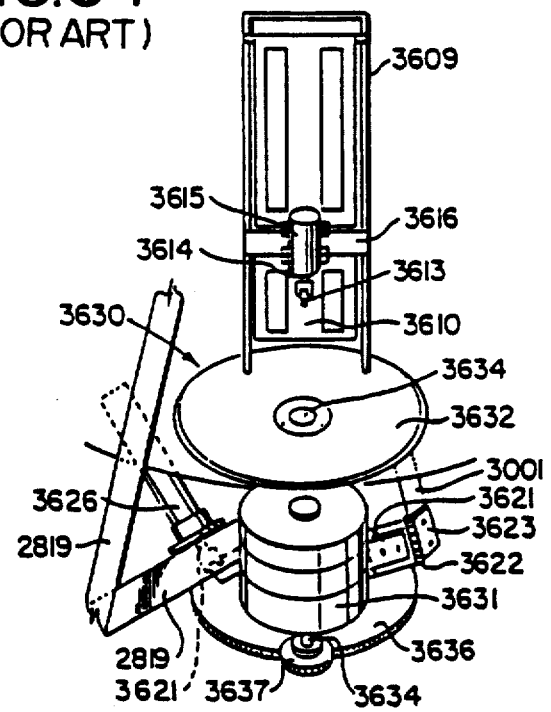
FIG. 36 (PRIOR ART)

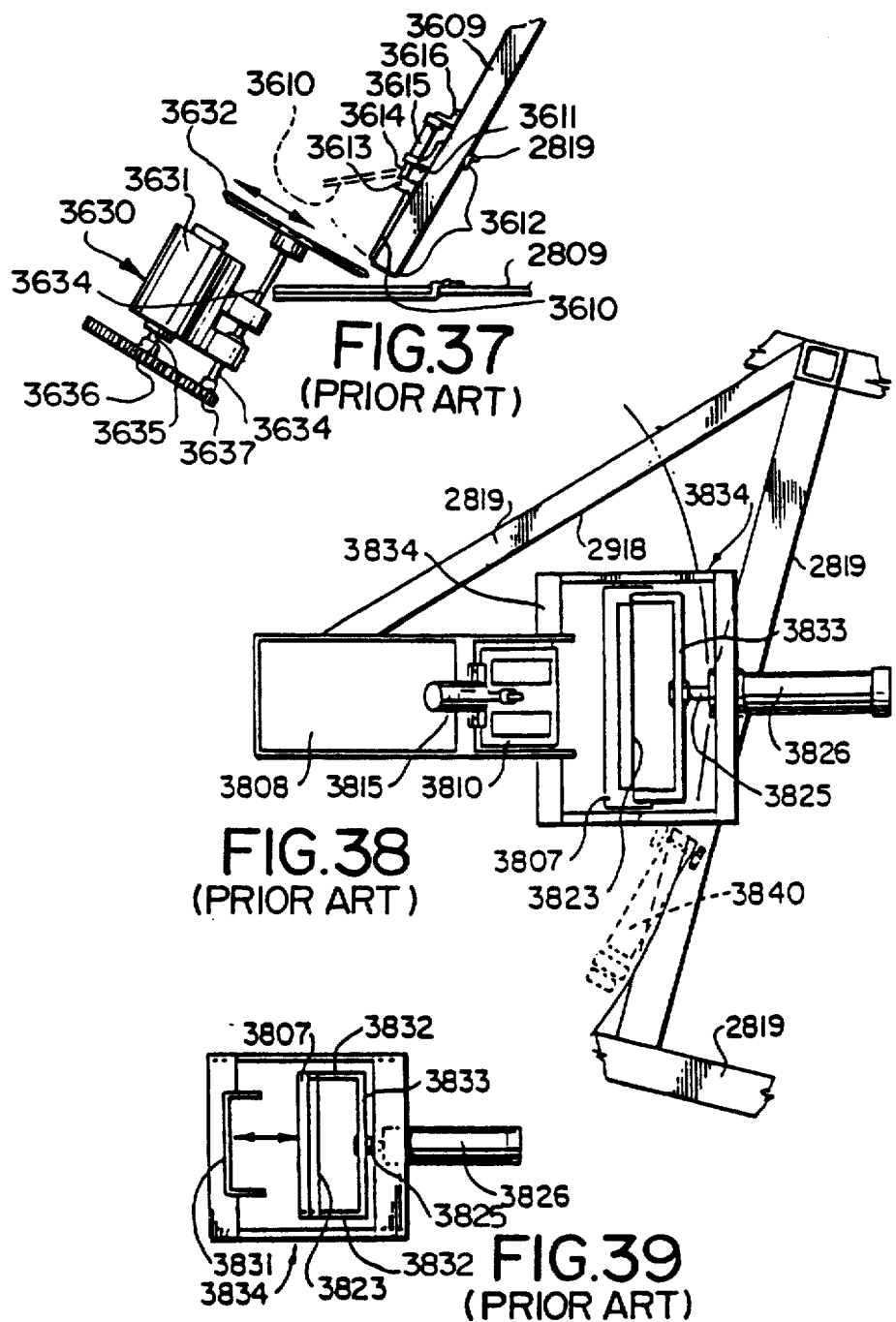

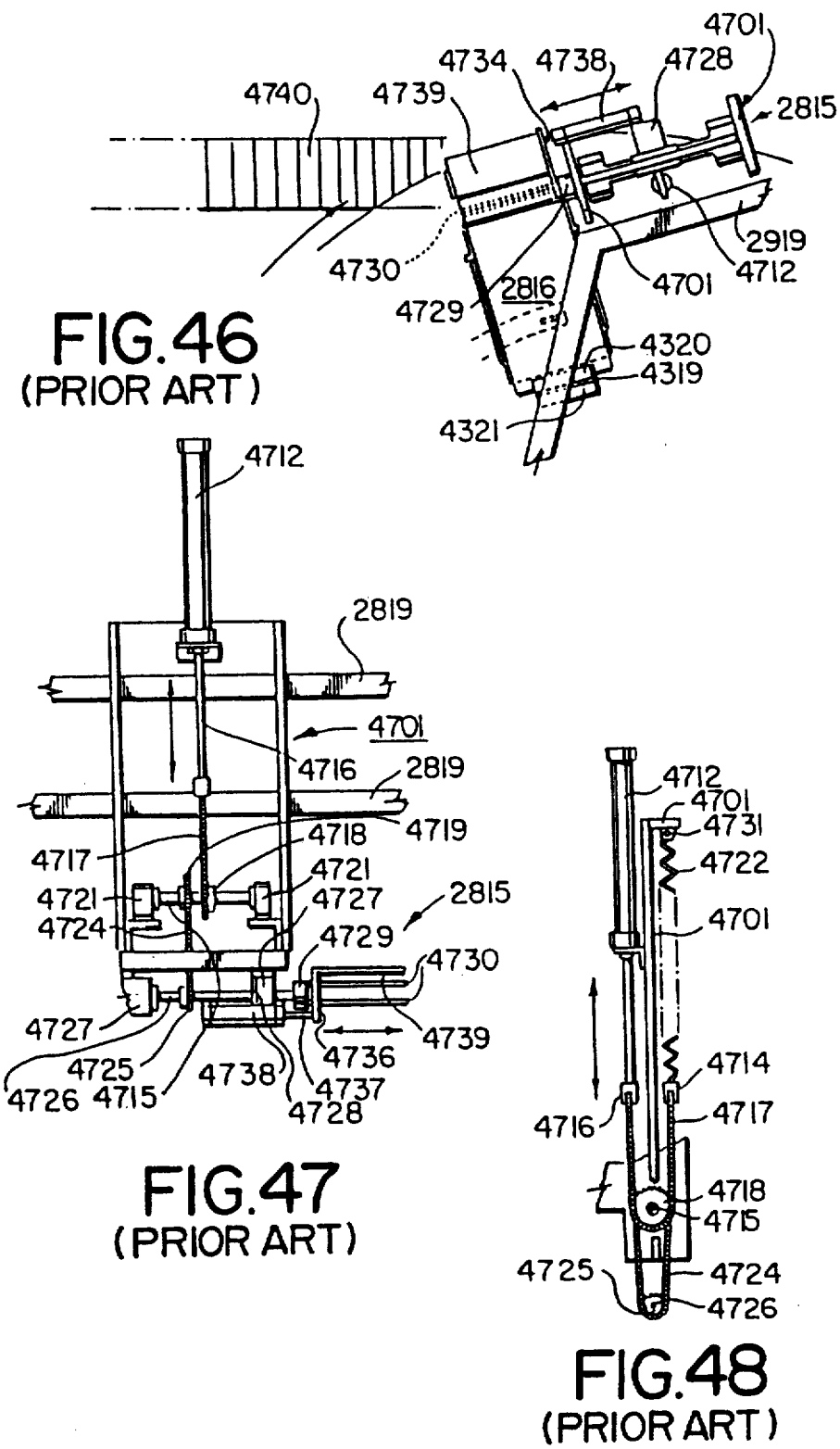

PASTE PUMP WITH AN ADJUSTABLE STROKE PISTON

This application is a continuation application of Ser. No. 07/639,421, filed Jan. 10, 1991, now abandoned.

This invention relates to an improved food paste pump, e.g. a tomato paste pump, or an egg mixture paste pump for an apparatus for the making of an overlapped-folded, filled, rolled food product.

Many patents are now directed to the manufacture of various rolled food products mechanically rather than by hand, and which include mechanical means for loading food onto a sheet of dough.

For example, Canadian Patent 586,999 patented Nov. 17, 1959 by Paul Wolf provided a method and apparatus for the manufacture of filled wafer sandwiches of oblong shape, in which a filling substance was spread in a layer onto aligned pastry strips.

Canadian Patent 985,657 patented Mar. 16, 1976 by David L. St. Clair provided a pump for dispensing food products, the pump being of the piston-type controlled by a spool type valve equipped with a discharge nozzle and enabling discharge of low viscosity food products into containers passing below the nozzle without variations in volume and in a substantially dripless manner, in which the spool was shifted in timed relation with the discharge of piston.

Canadian Patent No. 1,006,050 patented Mar. 1, 1977 by H. W. H. Hai provided an apparatus and method for the making of filled pastry rolls, especially spring rolls, which included means for feeding a filling into a square of pastry.

Canadian Patent 1,048,343 patented Feb. 13, 1979 by J. V. Hordman et al provided a positive displacement pump, including a pump body having a bore for receiving the liquid composition to be dispensed. Feed inlet means communicated with the bore for providing the composition to the bore. Spaced outlet means included a check valve for discharging the composition from the pump. A pressure chamber was defined intermediate the pump inlet and outlet. That chamber had an inlet, and an, outlet communicating with the pump outlet through the check valve. A piston was mounted for axial reciprocation in the bore between a first position at which the piston was withdrawn from the pressure chamber inlet, and a second position at which the piston passed at least partially into the pressure chamber inlet.

Canadian Patent 1,189,035 patented Jun. 18, 1981 by Heinz Borall provided a metering pump in which measured shots of liquid were dispersed into rows of bottles travelling along a production line.

U.S. Pat. No. 2,001,792 patented May 21, 1935 by L. G. Lombi provided a ravioli machine having means for introducing a filler material between two sheets of dough.

U.S. Pat. No. 2,351,788 patented Jun. 20, 1944 by V. R. Smith provided a method of stuffing fruit in which a discharge nozzle was supplied with a liquid-like stuffing from a source of supply, and in which a predetermined amount of that stuffing was discharged, either automatically or manually.

U.S. Pat. No. 2,611,327, patented Sep. 23, 1952 by E. A. Rudolph, provided a dispensing apparatus for depositing and spreading a metered quantity of filler on a piece of bread, including a rotatably impeller for expelling a predetermined quantity of sandwich filler from a hopper.

U.S. Pat. No. 2,960,045 patented Nov. 15, 1960 by K. Pentzler provided a machine for making molded pastry in which means were provided for continuously filling the length of a hollow pastry during its formation.

U.S. Pat. No. 3,547,052, patented Dec. 15, 1970 by M. Artiaga, et al, provided a sanitary closed system for depositing viscous fluids including a reciprocating piston or plunger to force the viscous fluid through nozzle tubes.

U.S. Pat. No. 3,580,302, patented May 25, 1971 by J. H. Riesenberg, provided a container filling machine including a piston reciprocable in a cylinder both to draw product from a source and to discharge product from the cylinder through a spool-type valve.

U.S. Pat. No. 3,602,154, patented Aug. 31, 1971 by E. H. Schimkat, et al, provided a food dispensing apparatus for depositing a measured amount of sauce on a base, the sauce dispenser including a valve provided with a cylindrical member disposed within a block and axially rotatable therein, with piston disposed in the cylinder.

U.S. Pat. No. 3,611,950 patented Oct. 12, 1971 by M. Battaglia provided a manicotti-making machine in which a filler dispenser deposited a controlled amount of filler material regulated by measuring means onto a dough sheet before the dough sheet was cut.

U.S. Pat. No. 3,631,818, patented Jan. 4, 1972 by S. Zito, provided a pizza sauce apparatus including a piston assembly to draw a measuring amount of sauce from a supply hopper and for discharging the sauce through a three-way valve and subsequently through distribution nozzles.

U.S. Pat. No. 3,667,971 patented Jun. 6, 1972 by F. W. Brunner provided apparatus for forming and wrapping foodstuffs in which slices of foodstuff were deposited in spaced sequence on a continuously moving strip of wrapping material; The apparatus included a nozzle for supplying metered amounts of a food paste positioned above a shaping channel so as to deposit a metered amount of such paste onto each slice of foodstuff as it passed beneath the nozzle.

U.S. Pat. No. 3,669,007 patented Jun. 13, 1971 by L. Pulici provided a method and apparatus for rolling and tucking filled foodstuffs, which included means for filling foodstuffs onto dough sheets.

U.S. Pat. No. 3,735,692 patented May 29, 1973 by A. Marchignoni provided an automatic pizza making machine which added a predetermined variety and quantities of ingredients by means of one or more dispensing containers fitted with dispensing devices, spaced from and mounted over a conveyor, so as to flavour the pizza dough mixture is it was carried along the conveyor processing lines.

U.S. Pat. No. 3,780,643 patented December 1973 by Papal provided an apparatus designed for the automatic assembling of pizza pies, which included a conveyor which was intermittently driven sequentially to index pastry shells to each of a plurality of food processing stations at which an appropriate foodstuff (e.g. tomato sauce, pepperoni, cheese) was added to the pastry shell.

U.S. Pat. No. 3,912,433 patented Oct. 14, 1975 by K. C. Ma provided an automatic egg roll making machine which included a food injector which deposited portions of food stuffing on to an egg roll skin as it passed beneath a rotary turntable.

U.S. Pat. No. 3,934,627, patented Jan. 27, 1976 by O. S. Buick, provided a filling machine involving the case of a cylinder provided with a discharge opening and a piston to expel fluid through the discharge opening.

U.S. Pat. No. 4,014,245 patented Mar. 29, 1977 by N. Obkawa provided a device for wrapping sheets around food in rolled form. The invention included a device having a horizontal and a vertical cylinder with pistons by which a certain amount of a food mixture was pushed out onto a precut dough sheet.

U.S. Pat. No. 4,060,027 patented Nov. 29, 1977 by D. J. Jenny provided an apparatus for applying ingredients to an edible product. That patented apparatus included a stepwise advancing conveyor band, and work stations arranged along the conveyor band where exact dosages of ingredients composed of small particles were applied.

U.S. Pat. No. 4,073,953 patented Feb. 14, 1978 by Trostman et al, provided apparatus for the production of rolled food products, e.g. chinese spring rolls, in which means were provided for depositing the stuffing ingredients into the tortilla dough sheet.

U.S. Pat. No. 4,084,493 patented Apr. 18, 1978 by E. D. Quinlana provided an apparatus for producing foodstuff products, namely a food product known as a "burrito", in which means were provided for depositing foodstuff onto a flavour sheet.

U.S. Pat. No. 4,108,221, patented Aug. 22, 1978 by G. W. Freimuth, provided a container filling machine including a cam-controlled pumping mechanism operating a piston pump for drawing fluid into the pump during a charge cycle, and for pushing the fluid out of the pump during a discharge cycle. An adjustable crank lever mechanism was included in the cam-controlled pumping mechanism for providing adjustment of the volume of fluid being pumped.

U.S. Pat. No. 4,244,404 patented Jan. 13, 1981 by B. A. Brockner, et al, provided a rotary piston filler including a cylinder and a piston therein with a cam bar and cam follower to produce reciprocation of the piston as a means for varying the magnitude of throw in the reciprocating movement of the piston.

U.S. Pat. No. 4,326,567 patented Apr. 27, 1982 by R. J. Mistorz provided a variable valve positive displacement, sanitary, liquid dispensing machine including a pump and valve assembly and a rotary valve, communicating with an outward passage disposed between the piston pump and the dispersing opening.

U.S. Pat. No. 4,334,464 patented Jun. 15, 1982 by T. Shinriki, provided an apparatus for encrusting jam including a ram to push out jam from a hopper through a cylinder-type valve and then be through a hose.

U.S. Pat. No. 4,388,059 patented Jun. 14, 1987 by K. C. Ma provided an automatic egg roll making apparatus which included a device for supplying the egg roll stuffing onto the egg roll dough.

U.S. Pat. No. 4,393,758 patented Jul. 19, 1983 provided a food processing apparatus for certain rolled food-products which included a dispenser station for controllably dispensing a precise amount of food filler onto a tortilla.

U.S. Pat. No. 4,439,124 patented Mar. 27, 1984 by H. Watonabe provided a machine for automatically making rolled food products such as spring rolls, crepes or the like which included a filling device for filling the food stuffing in the edible skin at a location on one side of the diagonal line of the shape of the skin adjacent a first corner area while the skin was placed on a support table.

U.S. Pat. No. 4,640,670 patented Feb. 3, 1987 by A. G. Svengren et al provided an apparatus for the preparation of a rolled pastry product which included means for placing a filling in a pastry sheet as it travelled along a conveyor belt.

U.S. Pat. No. 4,691,627 patented Sep. 8, 1987 by A. G. Roberts provided apparatus for making food products, e.g. burritos, having fillings, wrapped or enrobed in dough sheets, such as tortillas, which included means whereby a predetermined quantity of filling was deposited into a crease or groove, in a dough sheet.

U.S. Pat. No. 4,716,821 patented Jan. 5, 1988 by T. G. Mally et al provided a line for assembling stuffed proteinaceous patties, which included means for depositing edible filling materials, such as sauces, condiments and/or cheese onto a pre-formed patty.

U.S. Pat. No. 4,817,683 patented Apr. 4, 1989 by H. Laub III, et al, provided an ajustable, automatic, accurate, container-filling machine including a cylinder having a free flowing piston movable under fluid action alternately to charge and to discharge from alternate ends in conjunction with a spool valve which operated with the cylinder under mechanical activation to charge and discharge the cylinder and to permit fluid from the supply to feed the nozzle.

U.S. Pat. No. 4,832,961 patented May 23, 1989 by S. Aoki, provided an apparatus for quantatively providing food material including means for feeding the food material into a chamber from where it was expelled by a reciprocating cylinder.

In spite of these many patents there was still a need for an automatic machine for producing folded and rolled food-filled products of uniformly high quality at a high rate of production.

To achieve such need, in applicant's Canadian Patent No. 1,260,318, patented Sep. 26, 1989, a first embodiment of a food production apparatus was provided comprising: a) a supporting frame structure; b) a conveyor system supported thereon, the conveyor system passing a plurality of work stations; c) intermittent moving means for intermittently moving the conveyor system from one work station to the next work station downstream therefrom; d) a dough sheet feeding mechanism, the mechanism having means thereon for intermittently loading a square sheet of dough at a diamond orientation onto at least one discrete region of the conveyor system while the conveyor system is stationary; e) at least one foodstuff loading mechanism at one work station downstream from the dough sheet feeding mechanism and operable to load foodstuff onto discrete regions of the sheet of dough while the sheet of dough is resting on discrete region of the conveyor system and while the conveyor system is stationary; f) a loaded dough sheet folding mechanism at another work station downstream from the previously referred-to work station, and operable to provide a substantially-hexagonally-shaped, loaded folded, sheet of dough, while the conveyor system is stationary; g) a loaded, folded dough sheet rolling mechanism operable at another work station downstream from the previously referred-to work station and operable to provide a generally, cylindrical, overlapped-folded, loaded, rolled dough product, while the conveyor system is stationary; h) means for discharging the generally-cylindrical, overlapped-folded, loaded rolled dough product from the conveyor system; and i) means to synchronize the intermittent movement of the conveyor system with the sequential operation of the dough sheet feeding mechanism, with the foodstuff loading mechanism, with the loaded dough sheet folding mechanism, with the loaded, folded, dough sheet rolling mechanism and with the discharge means.

That patent also provided a second embodiment of such food production apparatus comprising: a) a supporting elongated frame structure; b) a continuous conveyor mounted longitudinally within the elongated frame structure, the continuous conveyor passing a plurality of work stations; c) intermittent moving means for intermittently moving a selected area on the continuous conveyor longitudinally along the supporting elongated frame structure from one station to a subsequent station downstream thereof; d) a dough sheet feeding mechanism at the front end of the continuous conveyor, the mechanism having means for intermittently providing a substantially-square shaped sheet of dough at a diamond orientation on the selected area of the conveyor while the conveyor is stationary; e) at least one foodstuff loading mechanism at another work station downstream from the dough sheet feeding mechanism and operable to load foodstuff onto a discrete region of the sheet of dough while the sheet of dough is resting on the conveyor and while the conveyor is stationary; f) a loaded dough sheet folding mechanism at another work station downstream from the previously referred-to work station, the folding mechanism having longitudinally-spaced apart, mutually-opposed means which are operable to hold a loaded sheet of dough which is in a diamond-shaped configuration in place, and transversely-spaced-apart, mutually-opposed means which are operable to raise opposed transverse corners of the loaded diamond-shaped sheet of dough and to fold them inwardly to meet and overlap slightly at the centre, thereby to provide a hexagonally-shaped, overlapped-folded, loaded sheet of dough, while the conveyor is stationary; g) a loaded, folded dough sheet rolling mechanism operable at another work station downstream from the previously referred-to work station and operable to provide a generally-cylindrical, overlapped-folded, loaded, rolled dough product, while the conveyor is stationary; h) means for discharging the generally-cylindrical overlapped-folded, loaded, rolled dough product from the continuous conveyor; and i) means to synchronize forward intermittent movement of the continuous conveyor with the sequential operation of the dough sheet feeding mechanism, with the dough sheet loading mechanism, with the loaded dough sheet folding mechanism, with the loaded, folded, dough sheet rolling mechanism and with the discharge means.

That patent also provided a third embodiment of such food production apparatus comprising: a) a supporting frame structure; b) a conveyor system supported thereon, the conveyor system comprising a rotary table rotationally mounted on the supporting frame structure, the rotary table being adapted to convey material thereon at a discrete location along the circumference of the rotary table along a circular path past a plurality of work stations; c) intermittent rotating means for intermittently rotationally moving the rotary table and hence the discrete location from one work station to the next, downstream, work station; d) a dough sheet feeding mechanism, the mechanism having means thereon for intermittently loading a square-shaped sheet of dough at a diamond orientation onto a first the discrete location on the rotary table while the rotary table is stationary; e) at least one foodstuff loading mechanism at one work station downstream from the dough sheet feeding mechanism, the foodstuff loading mechanism being operable to load foodstuff onto discrete regions of the sheet of dough while the sheet of dough is resting on discrete location on the rotary table and while the rotary table is stationary; f) a loaded dough sheet folding mechanism at a work station downstream from the foodstuff loading work station, the loaded dough sheet folding mechanism being operable to provide a substantially-hexagonally-shaped, overlapped-folded, loaded sheet of dough at the work station, while the rotary table is stationary; g) a loaded folded dough sheet rolling mechanism at a work station downstream from the loaded dough sheet folding work station, and operable to provide a generally-cylindrical, overlapped-folded, loaded, rolled dough product, while the rotary table is stationary; h) discharging means at the loaded folded dough sheet rolling work station for discharging the product from the rotary table; and i) means to synchronize the intermittent rotary movement of the rotary table with the sequential operation of the dough sheet feeding mechanism, with the foodstuff loading mechanism, with the loaded dough sheet folding mechanism, with the loaded folded dough sheet rolling mechanism and with the discharge means.

That patent also provided various embodiments of: the continuous conveyor; the rotary table; the dough sheet loading and unloading station; the dough sheet feeding apparatus; the pepperoni slicing and spreading mechanism; the cheese slicing and spreading mechanism; the ground product production and spreading mechanism; the dough folding mechanism; and the rolling mechanism for such embodiments of the food production apparatus.

That patent thus provided a food production apparatus for producing a foodstuff product, (known hereinafter as a "finger roll") formed in a manner to be particularly described hereinafter, from a thin sheet of flour dough that is used to wrap and encapsulate various selected food ingredients therewithin. This produced a novel form of heretofore conventional edible food products, e.g., egg rolls, spring rolls, manicotti, burritos, enchiladas, blintzes and canneloni. The sheet of dough was generally formed as a square-shaped sheet but was oriented as a diamond-shaped sheet of dough, which then has the food ingredients deposited centrally and transversely thereon in an elongated manner so as to allow the opposite corners of the sheet first to be folded towards and overlap slightly with one another and then to be rolled into the finger roll.

In order to produce that novel edible food product automatically, in one embodiment, the food production apparatus comprises a supporting elongated frame structure having a continuous conveyor system mounted thereto. Sequentially arranged along the length of the frame structure are a plurality of assemblies or stations, the first of which serves to place the square-shaped sheet of dough onto on the conveyor in a particular orientation, ie, as a diamond-shaped sheet of dough. Subsequent assemblies of stations serve to dispense the required food-ingredients onto the sheet of dough. Still other assemblies or stations then sequentially serve to fold and overlap the filled sheet of dough to an approximate hexagonal shape and then serve to roll the overlapped-folded, filled sheet of dough into a substantially-cylindrical roll. All these operations are performed on the sheet of dough while it is temporarily stationary, as the sheet of dough is intermittently moved from the forward end to the rearward end of the apparatus. The finger roll is then discharged from the apparatus to a further processing apparatus, preferably a deep fryer.

To simplify the summary of the apparatus of one embodiment of the present invention in the environment of the above-described embodiments of the food production apparatus, the following description relates to various stations wherein a particular action or step takes place.

Station A represents the beginning of the operation and will be known as the forward or front end of the frame structure and station E will represent the rear or back end thereof. Once the apparatus is started, the conveyer moves forward where the thin, square shaped sheet of dough, which is stacked in quantities on a stacking and dispensing apparatus (to be described in greater detail hereinafter) at station A is removed from station A and is individually placed on the continuous conveyer, in a particular orientation. The conveyer moves forward and stops at station B and a first set of foodstuff ingredients, e.g. egg mixture paste and tomato paste, are dispensed on the sheet of dough (in a manner to be described hereinafter), by means of the novel dispensing device of aspects of the present invention to be described in greater detail hereinafter.

The conveyor again moves forward, passing the sheet of dough with the first series of foodstuff ingredients thereon, to stop upon reaching station C. At this station, a second series of foodstuff ingredients, e.g. pepperoni, is sliced and loaded onto the sheet of dough by means of a pepperoni slicing and loading device (to be described in greater detail hereinafter).

The conveyer moves forward again to stop upon reaching station D. At this station, a third series of foodstuff ingredients, e.g. cheese, is sliced and loaded onto the sheet of dough by means of a cheese slicing and loading device (to be described in detail hereinafter).

The conveyer moves forward again, to stop at station E. Station E is a dough folding station where the diamond-shaped sheet of dough, filled along its transverse axis is first held down at its opposed longitudinal corners, and then its two diametrically-opposed exposed transverse corners are folded over (by a dough folding device to be described in greater detail hereinafter) so that their apices overlap slightly at the centre of the dough sheet, and so that the folded-over portions adopt a slightly-tapered, but generally hexagonally-shaped, configuration.

Following this operation, the conveyer-is then moved to stop at station F, where the folded-over sheet of dough is gripped and rolled by the two fingers or by the single finger of the rolling devices (to be described in greater detail hereinafter).

Then the novel product ie, the finger roll, so formed is discharged, and preferably, is fed to a second conveyor, and then to a deep frying apparatus (which does not form a part of the present invention).

Various synchronizing means are included herein so as to provide the necessary sequence of start-and-stop movement of the conveyor, coordinated with the actuation of each of the devices at each of the processing stations. Such synchronization means can be in the form of limit switches, or, preferably includes various motors controlled by a specially written software program in a microprocessor.

In order to produce that novel edible food product automatically, the food production apparatus in a second embodiment comprised a supporting frame structure having a rotary table conveyor system mounted thereto. Sequentially arranged around the perimeter of the rotary table structure are a plurality of assemblies or stations, the first of which served to place the square-shaped sheet of dough onto the conveyor in a particular orientation, ie, as a diamond-shaped sheet of dough. Subsequent assemblies of stations serve to dispense the required food ingredients onto the sheet of dough. Still other assemblies or stations then sequentially serve to fold and overlap the filled sheet of dough to an approximate hexagonal shape and then serve to roll the overlapped-folded, filled sheet of dough into a substantially-cylindrical roll. All these operations are performed on the sheet of dough while it is temporarily stationary, as the sheet of dough is intermittently moved from around the rotary table. The finger roll is then discharged from the apparatus to a further processing apparatus, preferably a deep frying apparatus (which does not form part of the present invention).

To simplify the summary of the apparatus of a second embodiment of the present invention in the environment of the above-described apparatus, the following description relates to various stations wherein a particular action or step takes place.

Station A represents the beginning of the operation and will be known as the first station of the rotary table structure and station E will represent the last station thereof. Once the apparatus is started, the rotary table is rotated where the thin, square shaped sheet of dough, which is stacked in quantities on the stacking and dispensing apparatus (to be described in greater detail hereinafter) at station A is removed from station A and is individually placed on the rotary table in a particular orientation. The conveyer rotates and stops at station B and a first set of foodstuff ingredients, e.g. egg mixture and tomato paste are dispensed on the sheet of dough (in a manner to be described hereinafter), by means of the novel dispensing device of aspects of the present invention to be described in greater detail hereinafter.

The conveyor again rotates, passing the sheet of dough with the first series of foodstuff ingredients thereon, to stop upon reaching station C. At this station, a second series of foodstuff ingredients, e.g. pepperoni, is sliced and loaded onto the sheet of dough by means of a pepperoni slicing and loading device (to be described in greater detail hereinafter).

The conveyer rotates again to stop upon reaching station D. At this station, a third series of foodstuff ingredients, e,g, cheese, is sliced and loaded onto the dough sheet by means of a cheese slicing and loading device (to be described in detail hereinafter).

The conveyer rotates again, to stop at station E. Station E is a dough folding station where the diamond-shaped-sheet of dough, filled along its transverse axis is first held down at its opposed longitudinal corners, and then its two diametrically-opposed exposed transverse corners are folded over (by a dough folding device to be described in greater detail hereinafter) so that their apices overlap slightly at the centre of the dough sheet, and so that the folded-over portions adopt a slightly-tapered, but generally hexagonally-shaped, configuration.

Following this operation, the conveyer is then rotated to stop at station F, where the folded-over sheet of dough is gripped and rolled by the two fingers or by the single finger of the rolling devices (to be described in greater detail hereinafter).

Then the novel product ie, the finger roll, so formed is discharged, and preferably, is fed to a second conveyor, and then to a deep frying apparatus (which does not form a part of the present invention).

Various synchronizing means are included herein so as to provide the necessary sequence of start-and-stop movement of the conveyor, coordinated with the actuation of each of the devices at each of the processing stations. Such synchronization means can be in the form of limit switches, or, preferably includes various motors controlled by a specially written software program in a microprocessor.

In spite of the above-identified Canadian Patent, there is still a need for more improvements.

An object of this invention is the provision of an improved such automatic machine which may be provided with an improved food paste dispensing device in which an accurate portion of such food paste is deposited on a sheet of dough.

An object of another aspect of this invention is the provision of an improved food paste dispensing device in which not only is an accurate portion of paste is deposited on a sheet of dough but also in which the quantity of dispensed paste may be accurately and easily changed.

By one aspect of this invention, a food paste dispenser is provided comprising a) a main food paste tank; b) a holding chamber connected to the main food paste tank; c) a rotary valve interconnecting the main food tank and the holding chamber, the rotary valve being drivable between a position where it interconnects the holding chamber to the main food paste tank, and a position where it interconnects the holding chamber to a discharge port of the rotary valve; d) a piston drivably reciprocable in the holding chamber; e) means controllably driving the piston downwardly in a loading action to a preset position within the holding chamber; and f) means drawing the piston upwardly to its full extent to a full discharge position.

The rotary valve is preferably provided with a "T"-shaped passageway to provide the two interconnecting positions and the piston preferably is fitted with an FDA approved piston seal.

The controllable driving means preferably comprise a rod pivotably connected to a driven rocker mechanism. Such pivotal connection is to a bar which is longitudinally movably connected to the rocker mechanism, the bar being threadably connected to a longitudinally extending threaded rod, and the position of the bar on the threaded rod preferably being fixable by means of a set screw lock. The rocker mechanism preferably comprises a framework pivotably secured to a means vertical frame member, and an air cylinder whose cylinder end is pivotally secured to the main vertical frame and whose rod end is pivotally secured to the pivotally-mounted framework.

The air cylinder preferably is dispensed vertically below the framework.

By another aspect of this invention a combination is provided of a pair of food paste dispensers as described above in a food production apparatus including a supporting frame structure, and a conveyor system supported thereon, the conveyor system passing a plurality of work stations, intermittent moving means for intermittently moving the conveyor system from one work station to the next work station downstream therefrom, the work stations including a sheet of dough feeding mechanism, a foodstuff loading mechanism, a sheet of dough folding mechanism, a folded sheet of dough rolling mechanism; discharge means, and control means to synchronize the intermittent movement of the conveyor system with the sequential operation of all said mechanisms at the work stations. The conveyor may be an intermittently-driven, endless, longitudinally-oriented, conveyor belt, or it may be an intermittently-rotatable, rotary table.

In such combination the line from the tomato paste pump preferably leads to the sheet of dough folding mechanism and/or the line from the egg mixture paste pump preferably leads to the folded sheet of dough rolling mechanism.

In the accompanying drawings,

FIGS. 7A and 7B are side elevational views of a food paste discharging pump of one aspect of this invention, for incorporation at the first foodstuff loading station in the apparatus shown in FIG. 6, FIG. 7A showing the pump in its loading position, and FIG. 7B showing the pump in the discharge position;

FIG. 12 is a perspective view of a cheese slicing and loading station of the food production apparatus of the embodiment of FIG. 1;

FIG. 13 is a side elevational view of the cheese slicing and loading station shown in FIG. 12;

FIG. 14 is a top plan view of the cheese slicing and loading station shown in FIG. 12;

FIG. 19 is a transverse section through the table and the conveyor of the rolling station shown in FIG. 18;

FIG. 20 is a top plan view of the rolling station shown in FIG. 18 and FIG. 19;

FIG. 21 is a longitudinal elevational view of a product unloading station;

FIG. 12 is a plan view of one embodiment of the sheet of dough loading and unloading mechanism of this second embodiment of the invention provided by Canadian Patent No. 1,260,318;

FIG. 34 is a side elevational view of a food, e.g. tomato, paste discharging pump of one aspect of this invention, FIG. 7A showing the pump in its loading position, and FIG. 7B showing the pump in its discharge position at the egg and tomato paste station of this second embodiment of the invention provided by Canadian Patent No. 1,260,318;

FIG. 35 is a top plan view of the egg and tomato paste station shown in FIG. 34;

FIG. 36 is a top plan view of one embodiment of the pepperoni slicing and loading station of this second embodiment of the invention provided by Canadian Patent No. 1,260,318;

FIG. 37 is a side elevational view of the pepperoni slicing and loading station shown in FIG. 36;

FIG. 38 is a top plan view of one embodiment of the cheese slicing and loading station of this second embodiment of the invention provided by Canadian Patent No. 1,260,318;

FIG. 39 is a top plan view of a portion of the cheese slicing and loading station shown in FIG. 38;

FIG. 46 is a plan view of one embodiment of the rolling apparatus of this second embodiment of the invention provided by Canadian Patent No. 1,260,318;

FIG. 47 is a front elevational view of the drive mechanism of one embodiment of the rolling apparatus of this second embodiment of the invention provided by Canadian Patent No. 1,260,318;

FIG. 48 is a side elevational view of the drive mechanism shown in FIG. 47;

In the embodiments shown in FIGS. 1-27, the food paste dispensing pump may be provided at Station B of a food processing machine which includes a conveyor, and the following processing stations which are mounted above the conveyor:

| Station A | Dough Sheet Loading, Unloading and Feeding Station; |
|---|---|
| Station B | First (Egg Mixture Paste & Tomato Paste) Foodstuff Ingredient Station; |
| Station C | Second (Pepperoni Loading) Foodstuff Ingredient Station; |
| Station D | Third (Cheese Loading) Foodstuff Ingredient Station; |
| Station E | Filled Dough Sheet Folding Station |
| and Station F | Filled, Folded Dough Sheet Rolling Station. |

The conveyor and processing stations may be those previously shown and described hereinbefore. The particular conveyor and processing stations selected are not critical to the food paste rolling dispensing pump of the present invention. However, for the sake of completeness, the following description is given.

Figure 1:
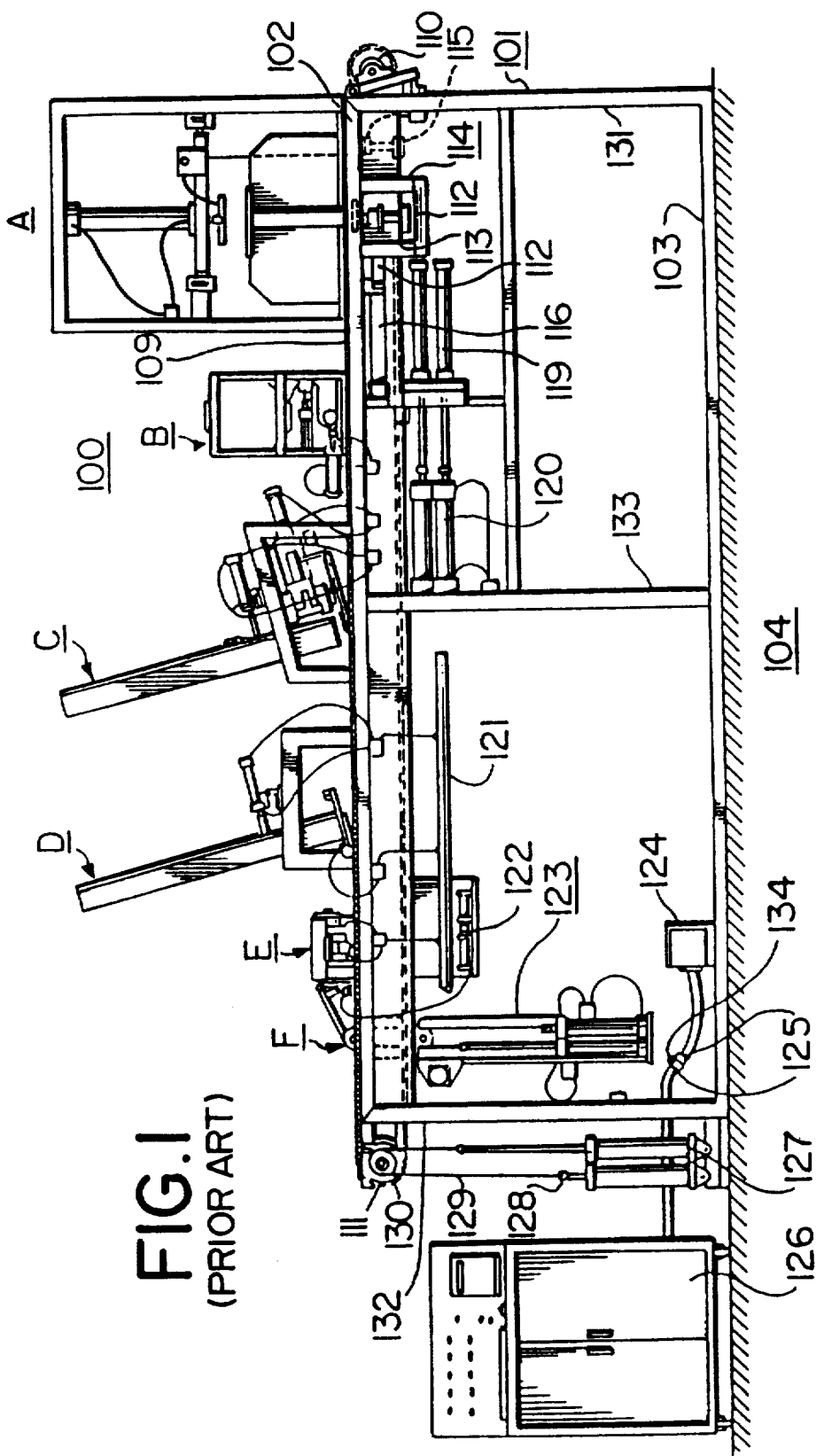
FIG. 1 is a side elevational view of the food production apparatus of one embodiment of the invention provided by Canadian Patent No. 1,260,318.
Figure 2:
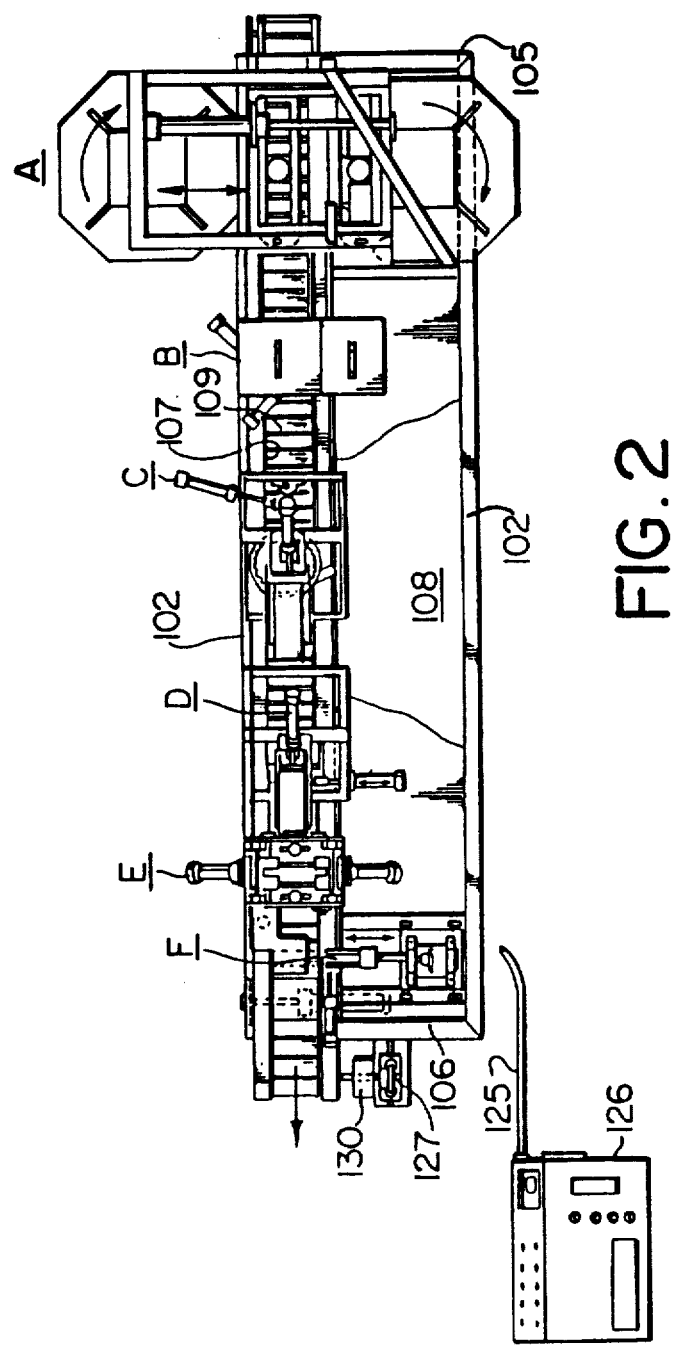
FIG. 2 is a top plan view of the food production apparatus of the embodiment of FIG. 1.

As seen generally in FIGS. 1 and 2, the apparatus 100 of this invention is built around a main frame 101 including a pair of upper, spaced-apart parallel longitudinal beams 102, a pair of lower, spaced-apart longitudinal bases 103, resting on a floor 104, a front vertical leg 131, a rear vertical leg 132 and an intermediate vertical leg 133, a pair of upper, transverse, spaced-apart connecting fore 105 and aft 106 end transverse beams and a pair of lower, transverse, spaced-apart, connecting fore and aft end transverse beams (not seen). Mounted within a longitudinal slot 107 in the upper table 108 supported on the top of the main frame 101 is a controlled, intermittently driven conveyor 109, entrained around a fore over-ride clutch, chain-driven, drive sprocket 110 and an aft idler and tensioner sprocket 111.

The main frame 101 serves not only to support the conveyor 109, and to provide a base table 108 for the superposed processing stations (to be described in detail hereinafter), but also to provide a site below table 108 for the operating mechanisms.

Thus, the frame provides a site near the fore end to accommodate a pair of over-ride clutch chain-driven sprockets 112, each driving a respective shaft 113 for a respective dough tray to be described later. This drive shaft mechanism is supported within a depending framework 114. It provides a site for the cylinder 115 for indexing the dough trays. It provides a site for the two tandemly-operated, pneumatic cylinders 116 (only one of which is seen), the rod ends 117 of which are tied a chain 118, so that operation of the cylinders 116 result in rotation of the pair of sprockets 112, one sprocket in a clockwise direction, the other sprocket in a counter clockwise direction, to result in corresponding rotations of the respective dough trays. It provides the site for vacuum cylinders 119, driven by pneumatic cylinders 120, to supply the vacuum to the vacuum pick-up heads (to be described later) of the dough pick-up- cylinders (to be described later).

At the aft end, it provides the site for the air supply manifold 121 for the pneumatic cylinders (to be described later) which operate the various processing stations, as well as the vacuum cylinders 122 to supply vacuum to operate the vacuum pickup pads (to be described later). There is also provision for a depending carriage 123 which moves the operating members at the product rolling station (to be described later). There is also provision for the main junction box 124 and the plugs 134 connected by line 125 to the console 126 for the preferred microprocessor which controls the synchronized operation of the apparatus. At the aft end of the framework 101 are a pair of tandemly operated pneumatic cylinders 127, the rod ends 128 of which are tied to a chain 129 entraining a sprocket 130 controlling the idler and tensioner sprocket 111. For aesthetic appearance, the main frame is also enclosed by a skirt (not seen) at the two lateral sides and at the fore and aft ends.

As mentioned before, the main frame 101 provides the base 108 for the frames (to be described later) supporting the various processing stations (to be described later).

Figure 3:
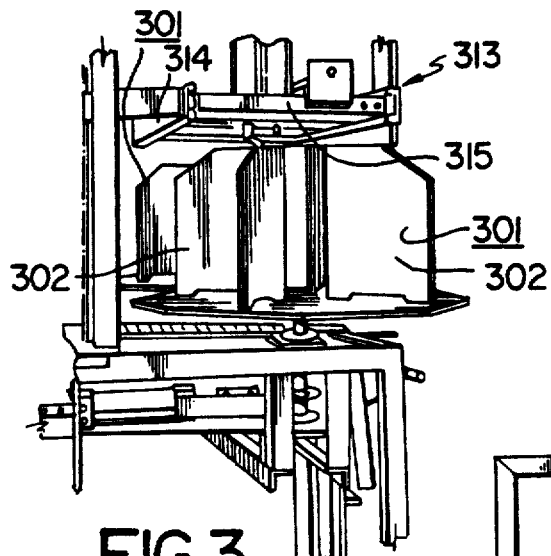
FIG. 3 is a perspective view of the dough sheet loading, unloading and feeding station of the food production apparatus of the embodiment of FIG. 1.
Figure 4:
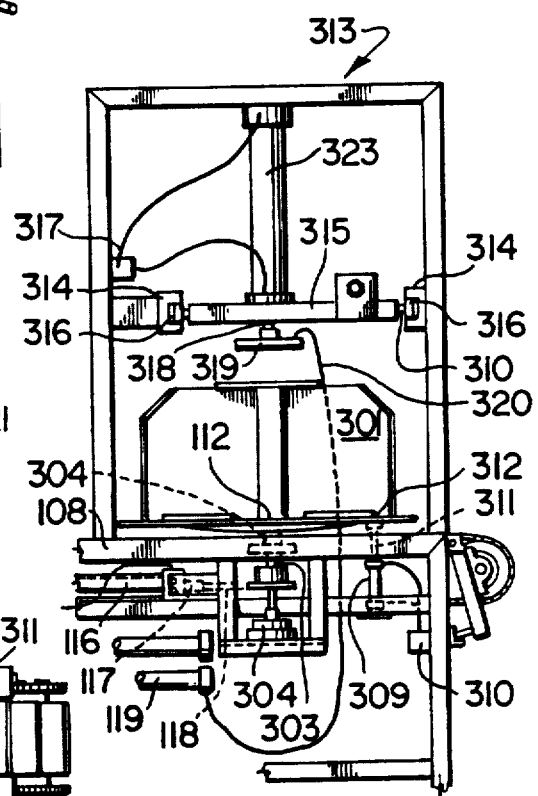
FIG. 4 is a side elevational view of the dough sheet loading, unloading and feeding station shown in FIG. 3.
Figure 5:
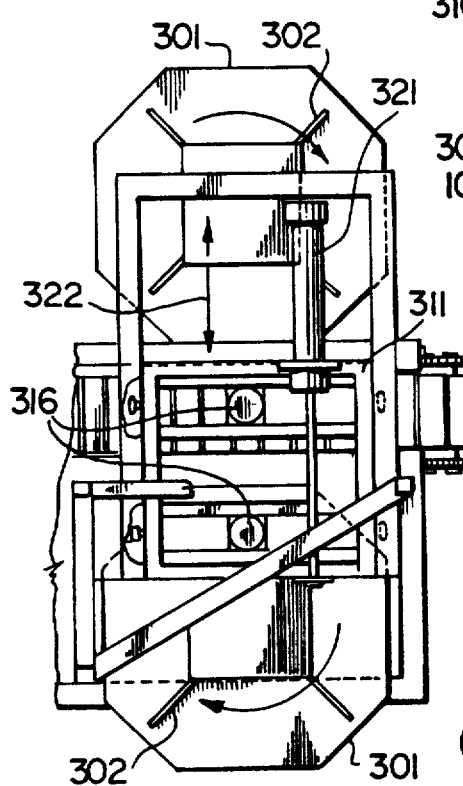
FIG. 5 is a top plan view of the dough sheet loading, unloading and feeding station shown in FIG. 4.
Figure 6:
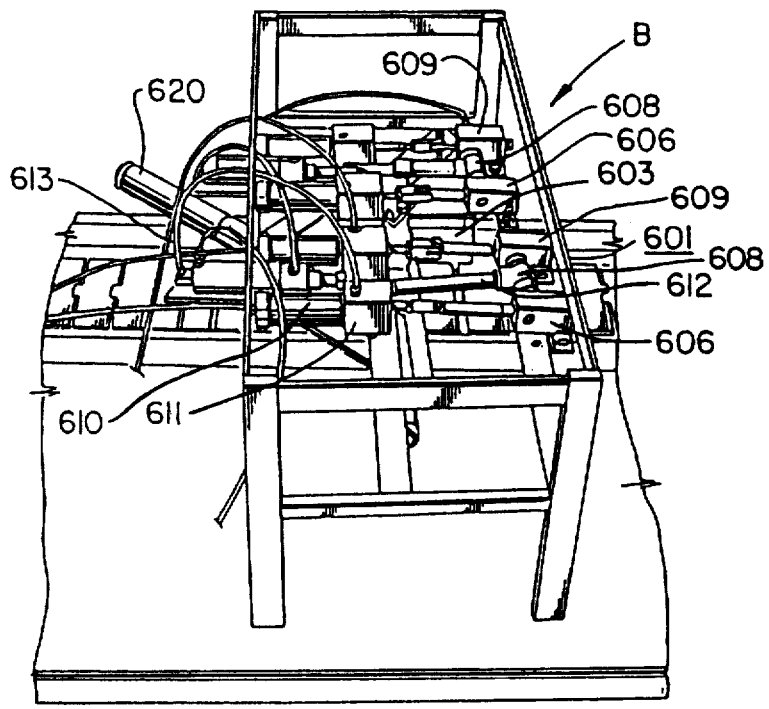
FIG. 6 is a perspective view (with the fluid foodstuff tanks omitted for clarity) of the first foodstuff loading station of the food production apparatus of the embodiment of FIG. 1.
Figure 7:
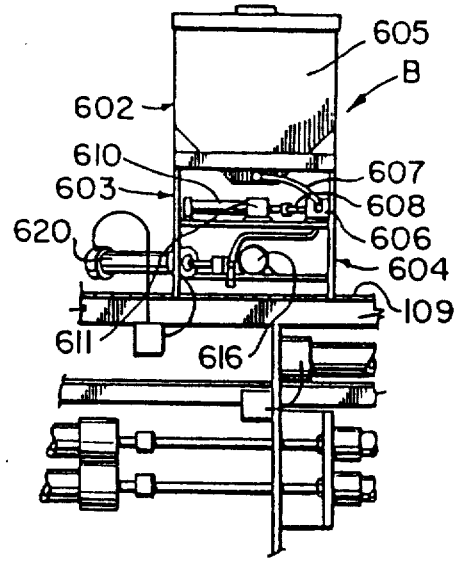
FIG. 7 is a side elevational view of the first food stuff loading station shown in FIG. 6.
Figure 8:
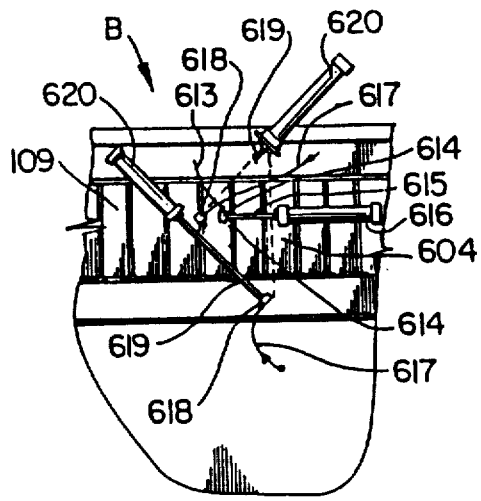
FIG. 8 is a top plan view of the lowermost level of the first foodstuff loading station shown in FIG. 6.

As seen in FIGS. 3, 4 and 5, the sheet of dough loading, unloading and feeding station A includes a pair of identical, rotatable dough trays 301, which each divided into a plurality of equal sections, e.g., in quarters, by dividers 302. Each dough tray 301 is supported on a shaft 303 which extends upwardly through the upper table 108. The shaft 303 is rotatably mounted between conventional bearings 304 and is driven by an over-ride clutch, intermittently-rotated chain driven sprocket 112, chain drive by a pneumatic cylinder drive arrangement, which includes a drive chain 118 tied to the rod end 117 of the pneumatic cylinder 116. Each dough tray 301 is provided with an indexing means comprising a pneumatic cylinder 309, controlled by control box 310, the rod end 311 of which is adapted to abut an associated lug 312 (of four equally spaced lugs on the bottom of the dough tray 301), so as to stop the rotation of the dough tray 301 at an exact predetermined position. To continue the rotation of the dough tray 301, the rotation drive arrangement is actuated at the same time the rod end 311 is withdrawn from abutment with the lug 312 during the return stroke of the cylinder 309. As soon as the rotation of the dough tray 301 begins again, the cylinder 309 is actuated to its power stroke to raise the rod end 311 upwardly into contact with the bottom of the dough tray 301. When the rod end 311 abuts the next lug 312, the rotation of the dough tray 301 is braked to a stop as the rotation drive arrangement is deactivated.

Each quarter of each dough tray 301 is loaded, e.g. manually by an operator, with square-shaped sheets of dough, in quantities of, e.g., eighty.

A support frame 313 is disposed completely above one of the pair of dough trays 301. The support frame 313 supports a transverse track 314 extending across the width of the table 108 from one dough tray 301 to the other dough tray 301. A carriage 315 is rollably mounted within the track on rollers 316 to traverse the width of the conveyor 109 and the width of the table 108. The carriage 315 supports a pair of vertically-mounted pneumatic cylinders 323, operated from respective box 317, the rod ends 318 of which are each fitted with a vacuum pick-up head 319, operated through line 320 from vacuum cylinder 119.

The square-shaped sheets of dough are placed on the conveyor in a particular orientation, e.g. they look like a diamond when viewed from above.

Station B, shown in FIG. 6, FIG. 7, FIG. 7A, FIG. 7B and FIG. 8 includes a main frame 601 supporting an upper sub-station 602, an intermediate sub-station 603 and a lower sub-station 604. The upper sub-station includes a tank 605 for tomato paste or sauce, and a tank (not seen) for a beaten egg mixture paste. Each tank leads to a premeasuring unit (to be described in detail in FIG. 7A and FIG. 7B), connected to the tank, e.g., 605 above.

The tomato paste premeasuring station has a feed line 613 from its associated dispensing chamber to a tomato paste spreader 614 which is secured to the rod end 615 of a transversely-mounted pneumatic cylinder 616.

The egg mixture paste premeasuring station has an associated feed line 617 from its associated dispensing chamber to each of two egg mixture paste spreaders 618. Each spreader 618 is at the rod end 619 of a respective one of two mutually perpendicularly-oriented pneumatic cylinders 620. The cylinders 620 are oriented along the two leading edges of the diamond-shaped sheet of dough.

As seen in FIGS. 7A and 7B, the food paste dispenser pump 650 includes a tank 651 which contains the desired food paste, e.g., tomato paste, or egg mixture paste. Each of the tomato paste dispenser and the egg paste dispenser is provided with such food paste dispenser pump 650. The food paste dispenser pump 650 is connected to a housing 652 via a vertical inlet passageway 680. Within housing 652 is a rotary valve 653 and a charging and discharging piston 654. The rotary valve 653 includes a "T"-shaped passage therethrough provided by a diametrical passageway 655 and an interconnected radial passageway 656. The housing 652 is provided with a horizontal discharge passageway 657 connected to a discharge port 658.

The piston 654 is adapted to be caused to reciprocate in a holding chamber 659, which is connected to rotary valve 653 via vertical connecting passageway 681. The piston 654 is provided with an FDA approved piston seal 660. The piston is pivotally connected by ear 661 to a rod 662, whose free end 663 is pivotally connected to a connecting bar 664. Connecting bar 664 is adapted to be longitudinally driven, by means of a threaded rod 665 passing through tapped longitudinal bore 666 through bar 664 and secured at each end to a framework 667, i.e. to open end 668 and to closed end 669 of framework 667. The position of the bar 664 with respect to rod 665 is fixed by means of set screw lock 670 passing through the floor 671 of framework 667.

Framework 667 is pivotally secured by ear 672 to the main frame 101 connected to framework 667, at transverse pivot pin 673, to the rod end 674 of an air cylinder 675 whose cylinder end 676 is pivotally secured at ear 677 to main frame 101.

In operation, to load the holding chamber 659, the rotary valve 653 is activated by an air cylinder (not shown) to the position shown in FIG. 7A with passageway 655 interconnecting the tank 651 to the holding chamber 659 via vertical inlet passageway 680. The piston 654 is caused to move downwardly (from the position shown in FIG. 7B) in the direction of the "load" arrow flow by means of the return stroke of air cylinder 675, which, by drawing framework 667 downwardly also draws piston 654 downwardly. The amount of downward movement of piston 654, and hence the volume of food paste drawn into holding chamber 659 is controlled by rotation of bar 664 by means of knob 678, thereby moving bar 664. The closer bar 664 is to closed end 669 of framework 667, the leas volume of paste in drawn into holding chamber 654.

To dispense the food paste from the holding chamber 659, the rotary valve 653 is actuated by its operating air cylinder (not shown) to the position shown in FIG. 7B where connecting passageway 681 interconnects the holding chamber 659 to the passageways 656 and 657 of the rotary valve 653 and thence to the discharge passageway 657. The air cylinder 675 is then actuated to its power stroke, thereby urging piston 654 upwardly in the direction of the "discharge" arrow.

Further charging and discharging of the holding chamber 659 takes place by repeating the above-described procedure.

The discharge port 658 is connected via its associated line to a spreader nozzle, secured to the rod end of a pneumatic cylinder and which is adapted to dispense a band of food paste along a selected region of a sheet of dough while the sheet of dough is disposed in a diamond-shaped orientation. In one embodiment of such apparatus, a pneumatic cylinder is aligned along the central transverse axis of the diamond-shaped sheet of dough, to dispense a band of tomato paste along a transverse axis of the sheet of dough. In another embodiment of such apparatus, a pair of pneumatic cylinders is disposed at right angles to one another and such pneumatic cylinders are disposed along the leading edges of the diamond-shaped sheet of dough, to dispense a band of egg mixture paste along the leading edges of the sheet of dough.

The diamond-shaped sheet of dough now has a rectangular area of tomato paste spread across its longest transverse axis, and also has a band of egg mixture paste spread along its two front or leading edges.

Figure 9:
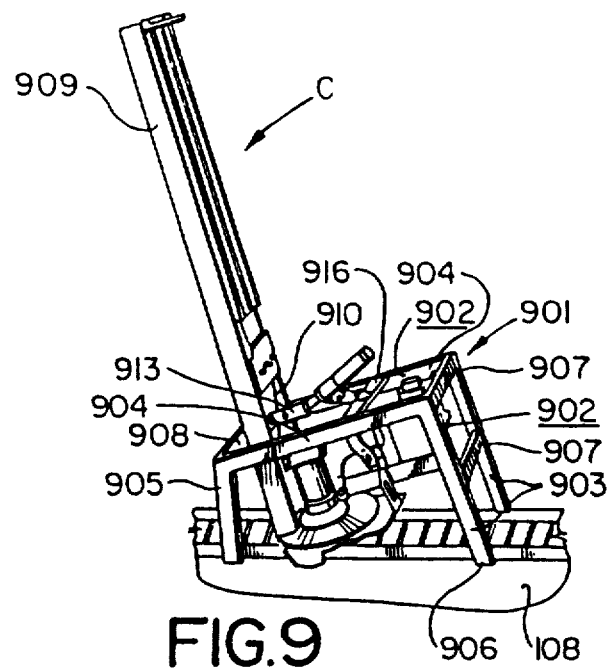
FIG. 9 is a perspective view of a pepperoni slicing and loading station of the food production apparatus of the embodiment of FIG. 1.
Figure 10:
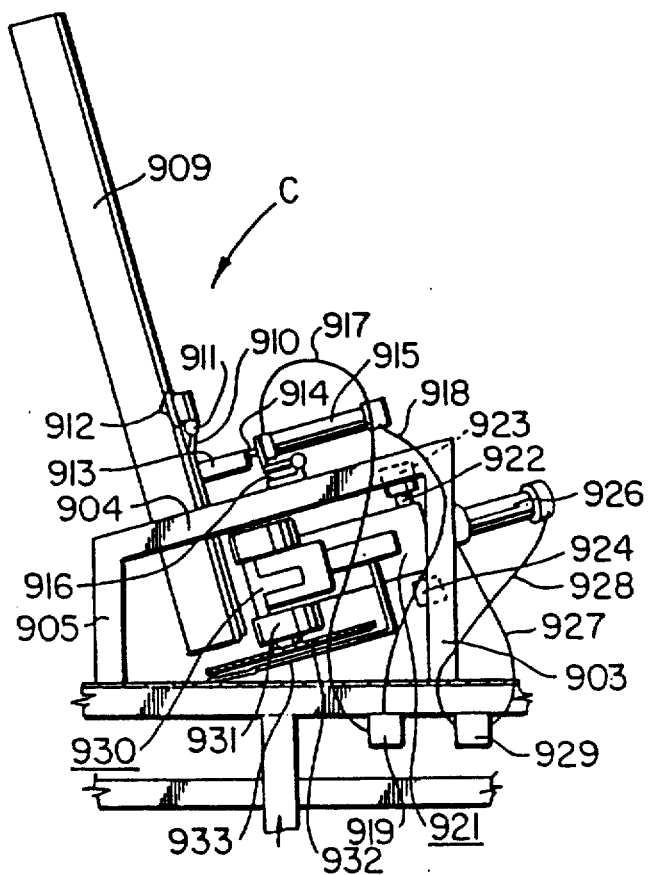
FIG. 10 is a side elevational view of the pepperoni slicing and loading station shown in FIG. 9.
Figure 11:
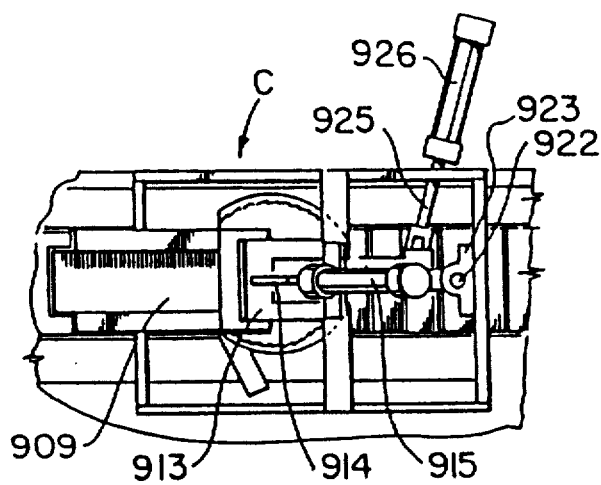
FIG. 11 is a top plan view of the pepperoni slicing and loading station shown in FIG. 9.

The pepperoni slicing loading station C shown in FIG. 9, FIG. 10 and FIG. 11 includes a three dimensional frame 901 including a pair of side frame members 02 constituted by a fore brace 903, a rearwardly and downwardly sloping longitudinal support member 904 and an aft shorter brace 905, the two side frame members being secured at their lower ends 906 to the table 108, and being interconnected at their fore and aft upper ends by a pair of fore 907 and a single aft 908 cross members, respectively.

An elongated holding tray 909 is secured to the side frame members 904, the holding tray 909 being for the purpose of supporting a plurality, e.g. three pepperoni sticks. A power-operated brake flap 910 is hingedly secured by transverse pivot 911 to a mid portion 912 of the holding tray 909 and is actuated to open (to allow entry of the pepperoni sticks) and to close (to allow gripping of the pepperoni sticks in an upright position) by means of a bar 913 secured to the rod end 914 of a pneumatically-operated cylinder 915 secured to a support member 916 of the frame 901. The cylinder 915 is operated by air lines 917, 918 from box 919.

A swingable carriage 921 is mounted to the fore end of the side frame members. Such swingable carriage 921 is secured to a rod 922, which is supported on an upper 923 and lower 924 pair of bearing mounts. The carriage is adapted to be intermittently swivelled by means of connection to the rod end 925 of a pneumatic cylinder 926.

A slicing arrangement 930 is secured to the swingable carriage 921, the slicing arrangement 930 including a pneumatic motor 931 which is activated intermittently to rotate a cutter blade 932. The thickness of the pepperoni sliced by the cutter blade 932 is controlled by a blade depth gauge plate 933. The cylinder is operated by air lines 927, 928, from box 929.

The cheese slicing and loading station D shown in FIG. 12, FIG. 13 and FIG. 14 includes a three dimensional frame 1201 including a pair of side frame members 1202, each constituted by a fore upright leg 1203, a longitudinal support member 1204 and an aft upright leg 1205, the two side frame members being secured at their lower ends 1206 to the table 108, and being interconnected at their fore and aft upper ends by fore 1206 and aft 1207 transverse cross members, respectively.

An elongated holding tray 1208 is secured to the side frame members, the holding tray 1208 being for the purpose of supporting a square-cross section bar of cheese (not seen). A power operated brake flap 1210 is hingedly secured at transverse pivot 1211 to a mid portion 1212 of the holding tray 1208 and is actuatable to open (to allow entry of the cheese) and to close (to allow gripping of the cheese in an upright position) by means of a bar 1213 secured to the rod end 1214 of a pneumatically-operated flap cylinder 1215 secured by brace 1216 to an intermediate transverse cross bar 1231 of the frame 1201. Cylinder 1215 is operated by air lines 1217a, 1217b from box 1218, connected by air line 1219 to air conduit 121.

A pair of spaced-apart transverse tracks, namely a fore, upper track 1220 and a rear, lower track 1221 is secured to the leading and trailing edges respectively of a rearwardly downwardly slopping transverse carriage 1222. A transverse cutter blade 1223 is reciprocally- and rollably-mounted in the tracks 1220, 1221 by means of rollers 1224. The blade 1223 is reciprocated across the transverse width of the conveyor 109 by means of connection to the rod end 1225 of a pneumatical cylinder 1226. Cylinder 1226 is operated from air line 1227, from box 1228 connected by air line 1229 connected to air conduit 121. A manually-adjustable, thickness-adjusting plate 1230 is disposed below the cheese slicing blade.

Figure 15:
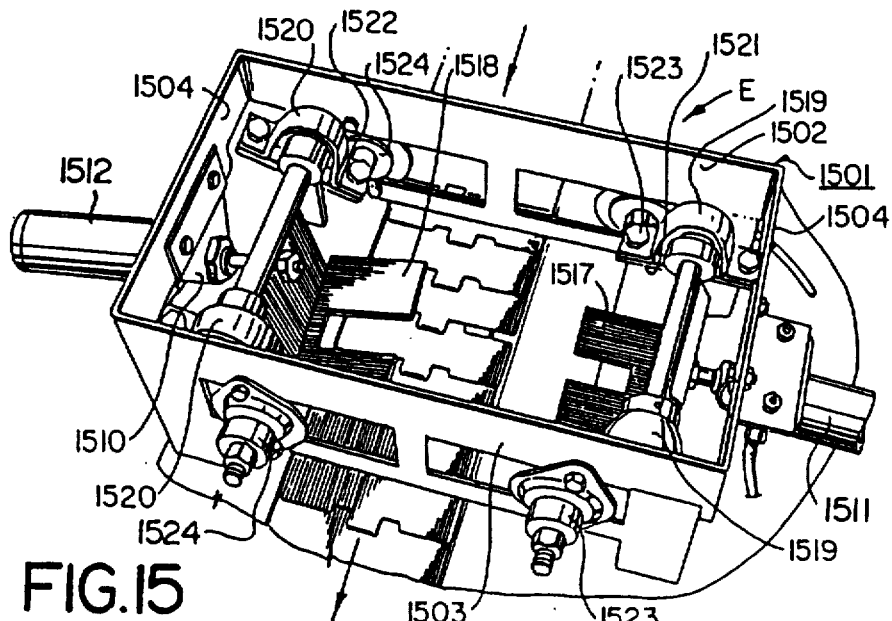
FIG. 15 is a perspective view of a dough folding station of the food production apparatus of the embodiment of FIG. 1.
Figure 16:
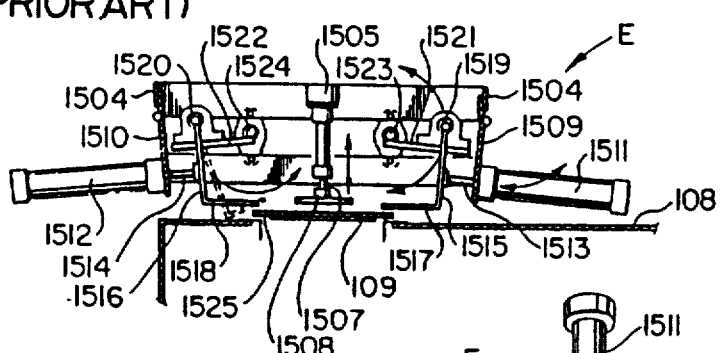
FIG. 16 is a transverse section through the table and the conveyor of the dough folding station shown in FIG. 15.
Figure 17:
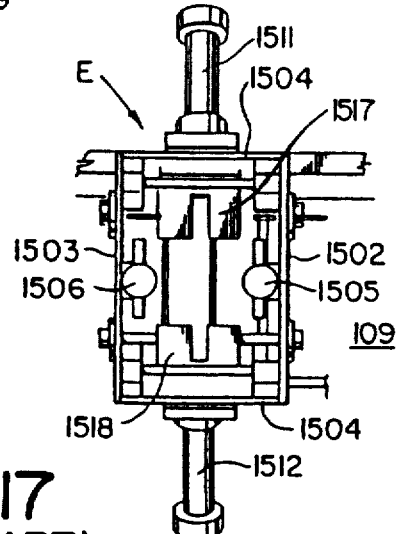
FIG. 17 is a top plan view of the dough folding station shown in FIG. 15.

The dough folder station E, shown in FIG. 15, FIG. 16 and FIG. 17 includes an open top and open bottom housing 1501 including upstream wall 1502 and downstream wall 1503 as well as two lateral and transverse walls 1504 disposed atop the table 108 and straddling the conveyor 109. Within the housing 1501 are a pair of vertically-disposed pneumatic cylinders 1505, 1506 disposed vertically above the central longitudinal axis of the conveyor. The rod ends 1507 of each cylinder carry a hold-down plate 1508 while the aft plate only also carries an impression stamp (not shown).

On each side of the conveyor 109 and at the marginal side edges 1504 of the housing 1501 is a hingedly-mounted plate 1509, 1510 to which the cylinder end of a pneumatic cylinder 1511, 1512 is secured. The rod end 1513, 1514 of the cylinder 1511, 1512 is secured to a downwardly extending folder arm 1515, 1516 to which are attached lower, inwardly-extending spaced-apart folder fingers 1517, 1518. The upper end of the folder arm is pivotally secured to an outboard pivot bearing 1519, 1520 mounted on a mounting plate 1521, 1522, which itself is pivotally secured to an inboard pivot bearing 1523, 1524.

Figure 18:
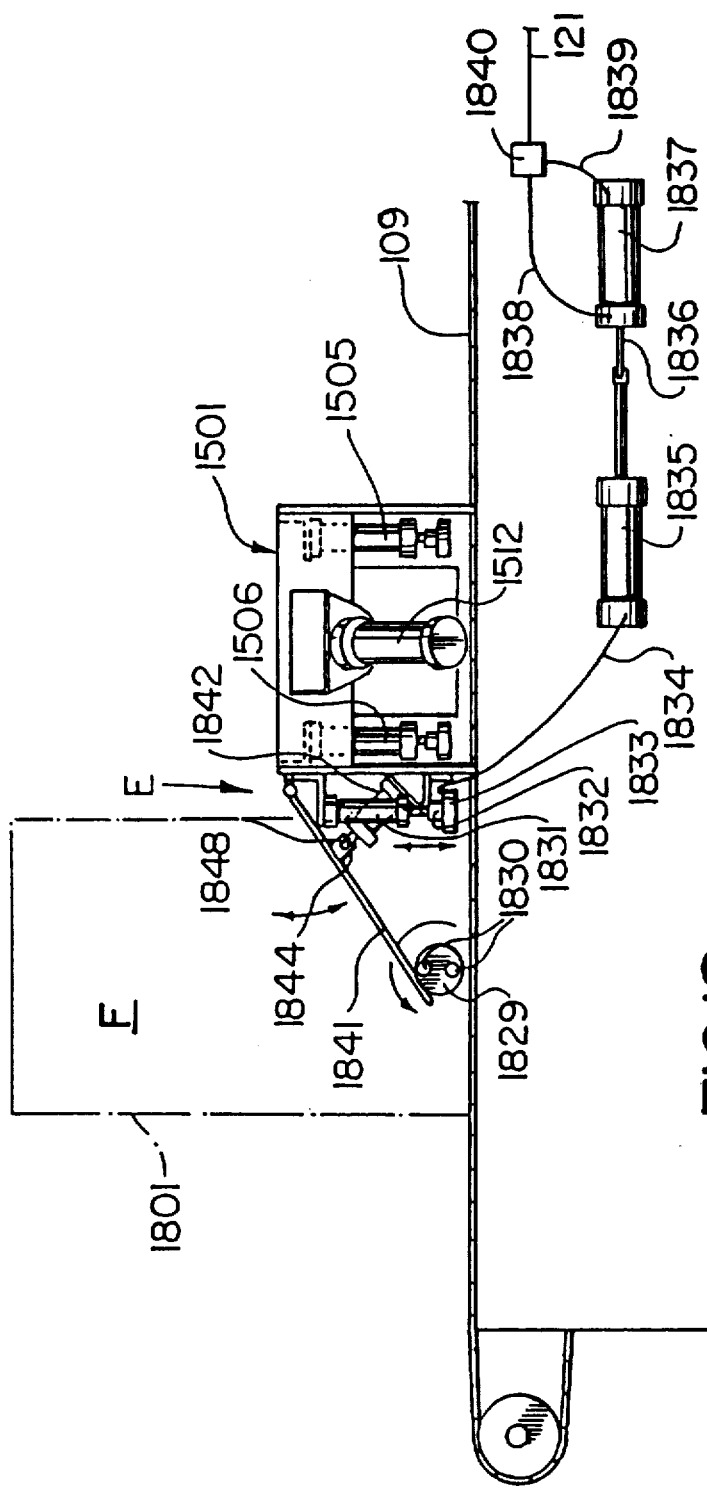
FIG. 18 is a longitudinal section through the table and the conveyor of a dough folding station and a downstream rolling station of the food production apparatus of FIG. 1.
Figure 22:
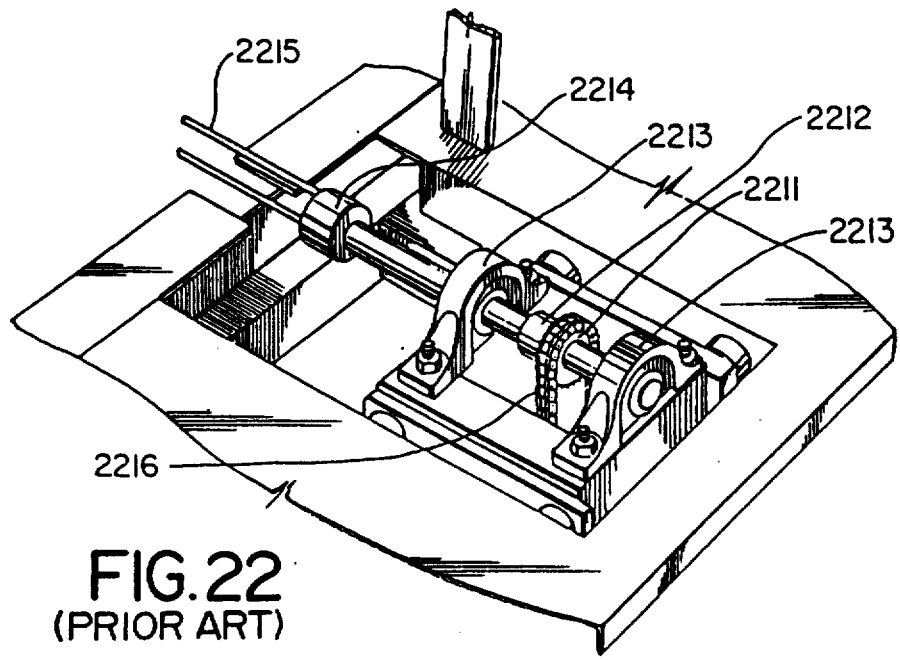
FIG. 22 is a perspective view of a roller carriage forming part of a second alternative rolling station of the food production apparatus of FIG. 1.
Figure 23:
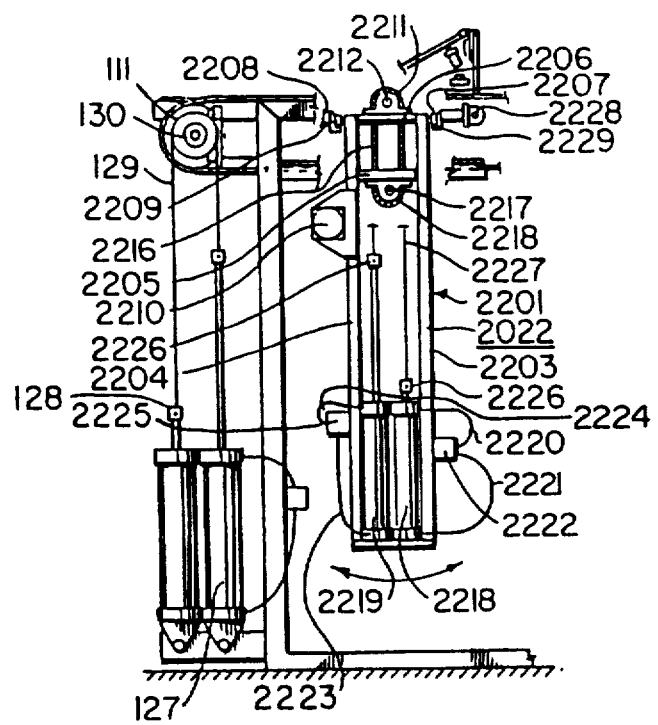
FIG. 23 is a side elevational longitudinal view of the end of the conveyor and of the carriage shown in FIG. 21.

In one alternative of a rolling station F, shown in FIG. 18, FIG. 19 and FIG. 20, an upwardly standing three dimensional frame 1801 is provided including a pair of lateral frameworks 1802, each including a fore (not seen) and aft 1804 upright column and an upper longitudinal cross-piece 1805, the pair of lateral frameworks 1802 being erected on one side of the conveyor with the base 1806 of the upright columns 1804 being secured to the table 108, and with the upper ends of the upright columns 1804 interconnected by fore 1807, and aft 1808 upper transverse bars.

Forward and aft longitudinally-spaced-apart pairs of upper and lower transverse, vertically-spaced-apart rails 1809 extend transversely across the lateral framework 1801 near the bottom thereof. A vertically-upright carriage 1810 is rollably mounted between the rails 1809 by means of rollers 1850 and is reciprocally-movable transversely along the rails 1809 by means of a pneumatic cylinder 1811, the end of the rod end 1812 thereof being secured to the outboard one of the lateral frameworks 1802.

Mounted on the carriage 1810 is a driven mechanism comprising a pair of tandemly-operated, vertically-oriented, pneumatic cylinders 1813, 1814, the rod ends 1816 of which each being tied to a chain 1817 which entrains a sprocket 1818 and also entraining a speed-reduction sprocket 1819, that sprocket 1819 being provided with an over-riding clutch 1820 for indexing the rolling fingers 1830. The speed-reduction sprocket 1819 is keyed into a shaft 1815 which is freely rotatably mounted between a pair of spaced-apart bearings 1821, 1822. Shaft 1815 also has keyed thereon a second sprocket 1823, which, in turn, is entrained by a second drive chain 1824 which entrains a finger-drive sprocket 1825. The finger drive sprocket 1825 is keyed to a shaft 1826 which is freely rotatably mounted between a pair of spaced-apart bearings 1827, 1828. The inboard end of the shaft 1826 (which is adapted to extend over the conveyor 109) is provided with a mounting cylinder 1829 fitted with a pair of rolling fingers 1830 which are adapted to be moved laterally by means of the carriage 1810 to extend over the conveyor 109.

As seen more clearly in FIG. 18, secured to the downstream end of the dough folder housing 1501 but upstream of the rolling station F is a vacuum pad cylinder 1831, the rod end 1832 of which is provided with a vacuum lift-up pad 1833 actuatable by being connected to cylinder arrangement 122 (FIG. 1) comprising a vacuum line 1834 from vacuum cylinder 1835 operated by the rod end 1836 of a pneumatic cylinder 1837, and fed with air through lines 1838, 1939 from box 1840 via air conduit 121. This actuation cause the lift-up pad 1833 to lift the trailing longitudinal edge of the overlapped-folded, foodstuff-containing dough sheet 1525.

Also connected to the downstream end of the dough folder housing 1501 is downwardly and rearwardly extending pressure plate 1841, biased downwardly by cylinder 1842, the rod end 1848 of which is connected to an ear 1844 on the pressure plate 1841 to hold the overlapped-folded dough sheet while it is being rolled by the rolling fingers 1830.

Also at the downstream end of the rolling station E (as seen in FIG. 21) and secured to the table 108 on one side of the conveyor 109 is an unloading cylinder arrangement 1845 including an unloading cylinder 1846, which is secured to the table 108, with the rod end 1847 thereof being secured to an unloading, finger 1848.

In a second alternative of the rolling station, F, shown in FIG. 22, and FIG. 23, FIG. 24 and FIG. 25, an inverted carriage 2201 is provided. The carriage 2201 includes a pair of lateral frameworks 2202, each including a fore 2203 and aft 2204 upright column, an intermediate upper longitudinal cross-piece 1205, and an upper longitudinal cross-piece 1206.

A fore and aft pair of longitudinally-spaced-apart rails 2207, 2208 extend transversely across the conveyor 109 thereof. This vertically-depending carriage 2201 is thus rollably mounted by means of wheels 2209 below the table 108 between the rails 2207, 2208 and is reciprocally movable transversely across the conveyor by means of a pneumatic cylinder 2210.

The rotation drive mechanism in this second embodiment includes an upper, drive sprocket 2211 keyed to a shaft 2212 extending transversely across the conveyor 109, the shaft 2212 being rotationally mounted between spaced-apart bearings 2213 and being provided with a mounting cylinder 2214 fitted with a pair of fingers 2215. The upper sprocket 2211 is entrained by a drive chain 2216 which also entrains a lower drive sprocket 2217, whose shaft 2218 is rotationally mounted on its associated bearing. The drive sprocket 2217 is driven by a drive mechanism operated by two tandemly operated pneumatic cylinders 2218, 2219 driven in tandem by being connected to air lines 2220, 2221 at box 2222 and air lines 2223 and 2244 at box 2225. The free end of the rod 2226 of each cylinder 2218, 2219 is tied to a drive chain 2227 entraining a master drive sprocket (not shown) also keyed to the same shaft 2218 as the lower drive sprocket 2217. As stated, the cylinders 2218, 2219 are operated in tandem, with the power stroke of one cylinder being synchronized with the return stroke of the other cylinder.

This embodiment of a finger rolling station F is provided with the same finger-rolling assisting and discharging stations described above with respect to FIG. 18 and 21.

Figure 24:
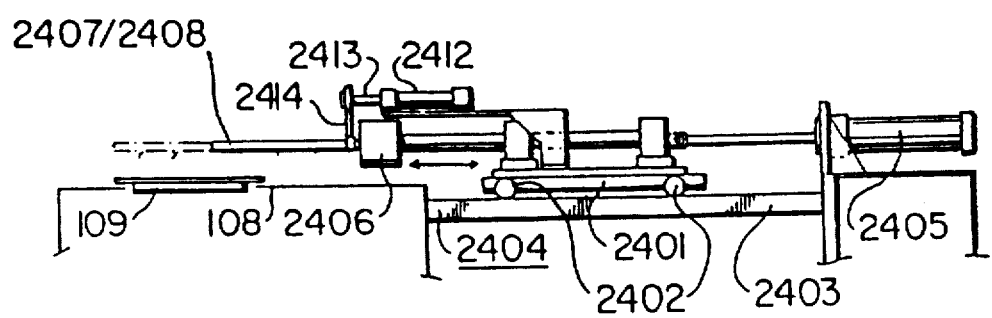
FIG. 24 is a side elevational transverse view of the second alternative rolling station shown in FIG. 21 and FIG. 22.
Figure 25:
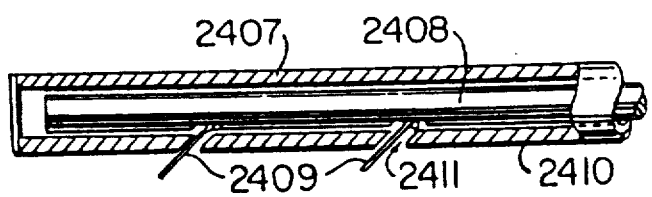
FIG. 25 is an enlarged view partially sectionalized of the single rolling finger of FIG. 23.

A third embodiment of a finger rolling and product unloading station F is shown in FIG. 24 and FIG. 25. This station includes an upper carriage 2401 provided with wheels 2402 adapted to roll along a bed 2403 provided in a transverse extension 2404 of the table 105. The carriage 2401 is provided with an operating system namely pneumatic cylinder 2405 which is actuated to roll an extension of the carriage 2401 transversely across the conveyor 109. The carriage 2401 also includes an extension 2406 connected to an outer sleeve 2407/inner rod 2408 combination. The inner rod 2408 is provided with a plurality of high tension wire prongs 2409 which are adapted to lie flush with the outer surface 2410 of the outer sleeve 2407 at a like plurality of holes 2411 drilled at an angle through the outer sleeve 2407 when the outer sleeve 2407 is extended, and to project completely out through those holes 2411 (as shown) when the outer sleeve 2407 is retracted. A pneumatic cylinder 2412 is mounted in the carriage 2401, and the rod end thereof 2413 is provided with an operating mechanism 2414 to extend and retract the outer sleeve.

The finger-rolling assisting stations (not shown) used with this embodiment is the inverse of the one used with the first two embodiments and shown in FIGS. 18 and 20. The pressure plate assembly 1841 and the dough sheet lifter assembly 1831 are all the same. However, the unloading assembly 1845 shown in FIG. 21 differs in that, instead of a single unloading finger 1848, there are two spaced-apart unloading fingers, looking much like rolling fingers 1830 shown in FIG. 19 or unrolling fingers 2215 shown in FIG. 22.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station. The station B for applying the egg mixture to the leading edges of the diamond-shaped dough sheet is still required and operates as previously described.

Figure 26:
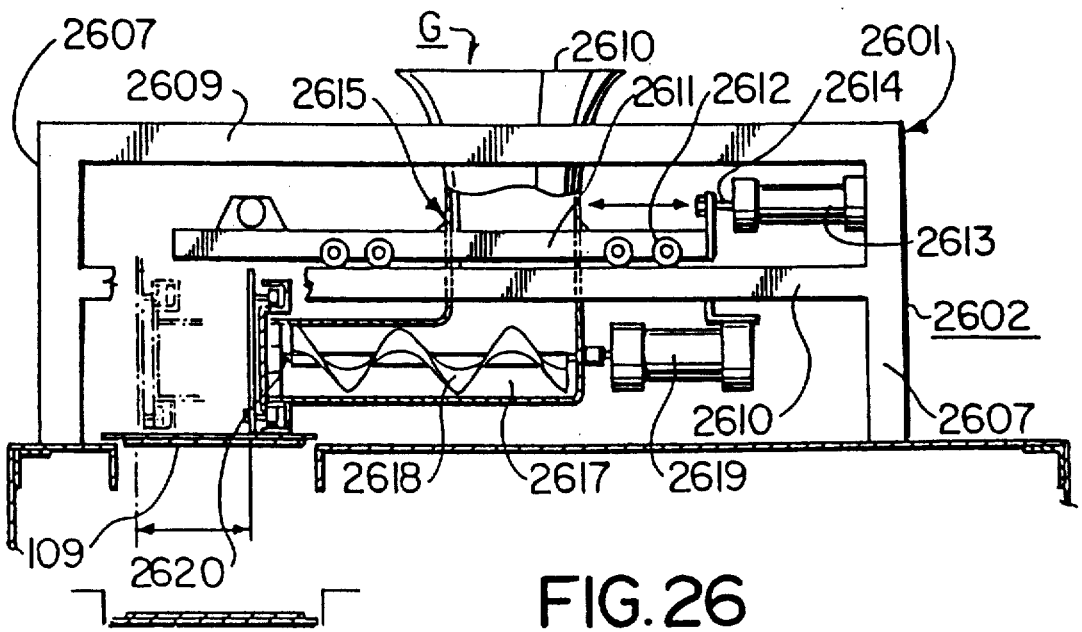
FIG. 26 is a transverse section showing a second alternative foodstuff loading station of a food production apparatus of another embodiment of this invention.
Figure 27:
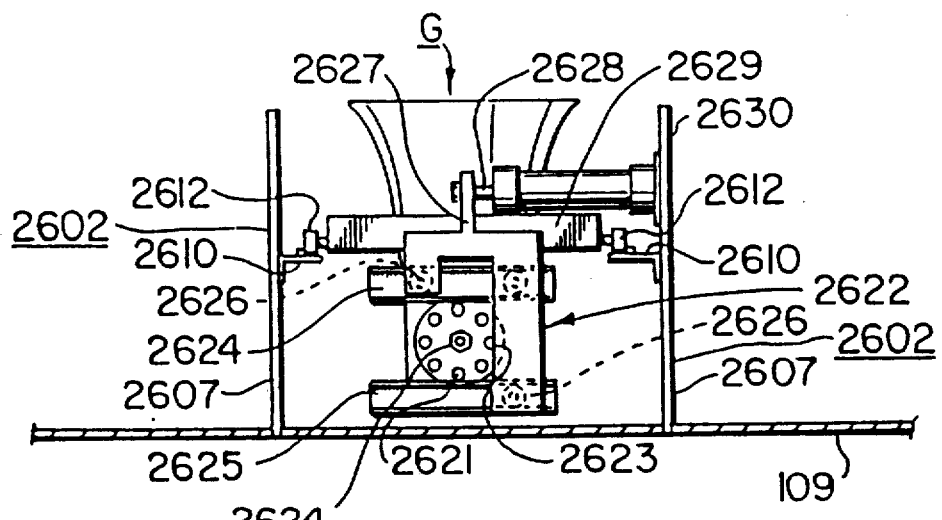
FIG. 27 is a longitudinal elevational view of the foodstuff loading station of FIG. 25.

The meat loading station G shown in FIG. 26 and FIG. 27 includes a main frame unit 2601 including a pair of lateral frames 2602 consisting of a pair of lateral upright legs 2607, an intermediate transverse cross member 2608 an upper transverse cross member 2609. The lateral frames 2602 are disposed astraddle the conveyor 109, with the legs 2607 secured to the table 108. A pair of mid, internal, longitudinal tracks 2610 are also provided.

Disposed within the framework is a transversely-rollable carriage 2611 provided with wheels 2612 rollable on the tracks 2610. A pneumatic cylinder 2613 is secured to one lateral side frame 2607, and the free end of the rod end 2614 thereof is secured to an end of the carriage 2611 to cause the carriage 2611 to oscillate transversely across the conveyor 109.

The carriage 2611 supports a meat grinder or mincer assembly 2615. The meat grinder assembly 2615 includes a vertical funnel 2616 leading to a horizontal, transverse cylindrical auger chamber 2617 provided with a rotatably driven auger 2618. The auger 2618 is driven by means of a pneumatic motor 2619. The downstream end of the auger chamber 2617 is provided with a discharge plate 2620 provided with a plurality of apertures 2621. The discharge plate 2620 is traversed by a cutting blade assembly 2622 including a blade edge 2623, the assembly being mounted within upper 2624 and lower tracks 2625 by means of rollers 2626 secured to the assembly 2622. The assembly 2622 includes a bracket 2227 to which is secured the free end of the rod end 2628 of a pneumatic cylinder 2629 secured to one of the longitudinally-extending lateral side frame members 2630.

The remaining stations for folding and rolling the filled product are part of the modified apparatus and constituted as previously described and are operated in the same fashion as previously described.

As seen in FIGS. 28-56 which show two other embodiments of the invention provided by Canadian Patent No. 1,260,318, a rotary table 2809 replaces the linear endless conveyor 109 as a conveyor system. Disposed around the outer circumference of the rotary table 2809 are: a pair of tandemly-operated dough sheet feeders 2810 at STATION A; a pepperoni slicer and loader 2812 at STATION B; a cheese slicer and loader 2813 at STATION C; an egg mixture paste pump and a tomato paste pump at Station D; a loaded dough sheet folder 2814 at STATION E; and a loaded folded dough sheet roller 2815 at STATION F.

Figure 28:
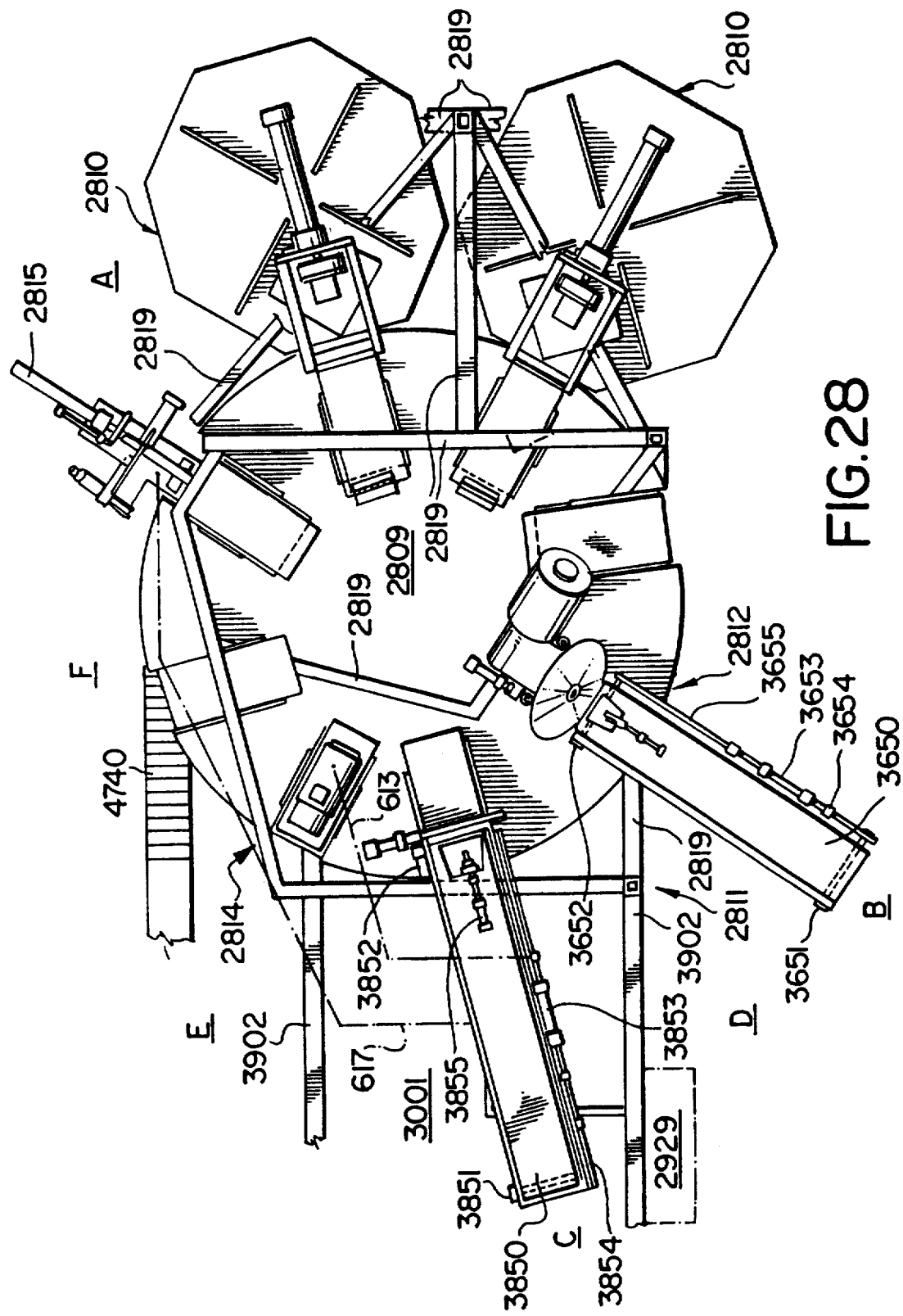
FIG. 28 is a top plan view of the food production apparatus of a second embodiment of the invention provided by Canadian Patent No. 1,260,318 as modified by the incorporation therein of the food paste discharge pump of FIGS. 7A and 7B.
Figure 29:
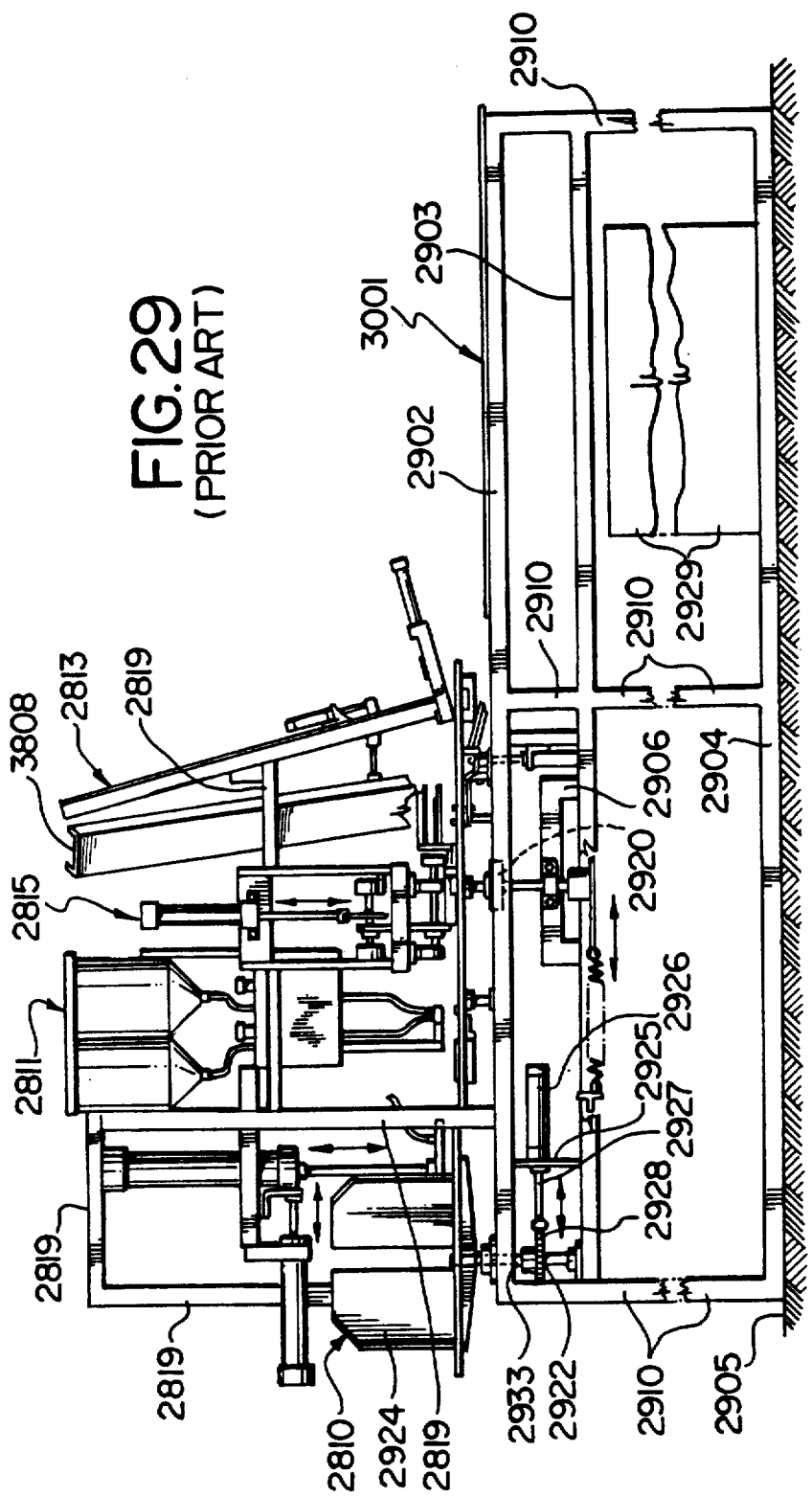
FIG. 29 is a side elevational view of the food production apparatus of this second embodiment of this invention shown in FIG. 28.

As seen more clearly in FIGS. 28 and 29, the above-described second embodiment of the invention, is built around a main rectangular parallelepiped frame 3001. Such frame 3001 is provided by a side frame which includes an upper, longitudinal beam 2902, resting on a floor 2905, a lower longitudinal base beam 2904 and a mid-longitudinal beam 2903 which is midway between, and parallel to beam 2902 and base beam 2904. The side frames are connected together by transverse beams 2912, 2913 and leg 2910. Mounted atop main frame 3001 is an upper framework including plates, cross pieces, longitudinal pieces and bracing pieces, all numbered 2819. Mounted within a bore 2920 in a support table 2902 supported on framework 2903 of the main frame 3001 is an intermittently-rotationally-driven, rotary table 2809, driven as will be described hereinafter with reference to FIG. 30.

The main frame 3001 serves not only to support the rotary table 2809, and to provide a base to support the superposed processing stations (to be described in detail hereinafter), but also to provide a site for the operating mechanisms.

Thus, the main frame 3001 provides a site to accommodate a pair of over-ride clutch, chain-driven sprockets 2922, each driving a respective shaft 2933 for a respective dough tray 2924 to be described later. This drive shaft mechanism is supported between beams 2902 and 2903 and vertical cross piece 2925. The main frame 3001 provides a site for a cylinder for indexing the dough trays 2924, which, while not shown in FIG. 30, has been described in detail with respect to FIGS. 1 and 2. The drive for the dough trays is provided by two tandemly-operated, longitudinally-oriented pneumatic cylinders 2926 (only one of which is seen), the rod ends 2927 of which are tied to a drive chain 2928, so that operation of the cylinders 2926 results in rotation of the pair of sprockets 2922, one sprocket in a clockwise direction, the other sprocket in a counter-clockwise direction, to result in corresponding rotations of the respective dough trays 2924. While not seen in FIGS. 28 and 29, the main frame 3001 also provides the site for vacuum cylinders, driven by pneumatic cylinders, to supply the vacuum to the vacuum pick-up heads (to be described later) of the dough pick-up cylinders (to be described later).

While not seen in FIGS. 28 and 29, the main frame 3001 provides the site for an air supply manifold for the pneumatic cylinders (to be described later) which operate the various processing stations, as well as the vacuum cylinders to supply vacuum to operate the vacuum pick-up pads (to be described later). The main frame 3001 also provides a site for a computer and valve enclosure 2929 for the microprocessor, which is the preferred mechanism to control the synchronized operation of the apparatus. For aesthetic appearance, the main frame 3001 is also enclosed by a skirt (not seen) at the two lateral sides and at the fore and aft ends.

Figure 30:
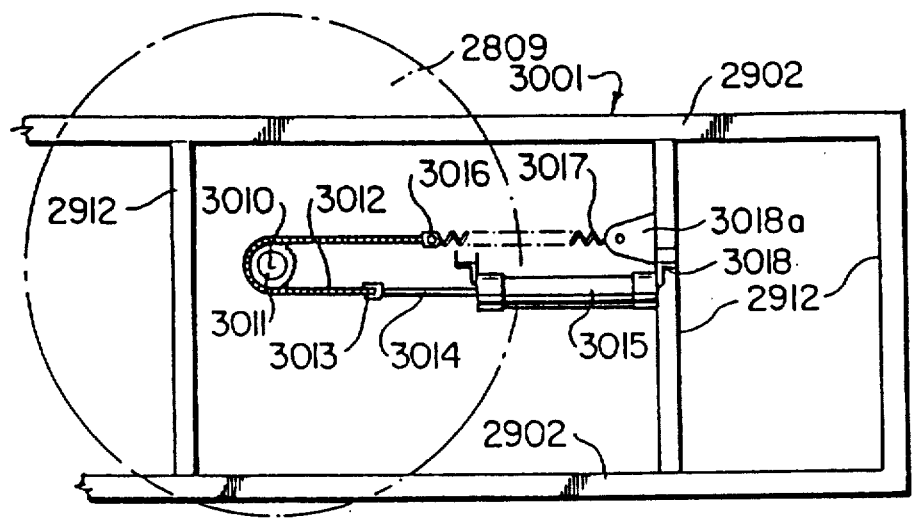
FIG. 30 is a bottom plan view (looking up) of a spring drive for the rotary table of this second embodiment of this invention, with the rotary table shown in phantom.
Figure 44:
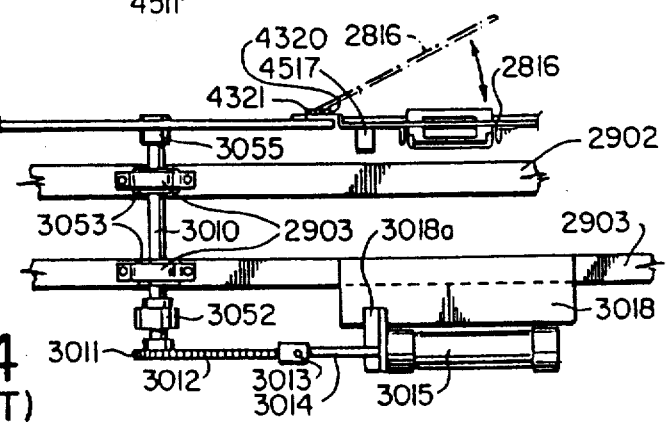
FIG. 44 is a transverse section of the operating mechanism for the drive of the rotary table.

The drive mechanism for the rotary table 2809 is shown in FIGS. 30 and 44, and includes a vertically-oriented axle 3010 which is secured to the rotary table 2809 at connecting bushing 3055, and which is secured at its lower end to an override clutch 3052 and thence to a drive sprocket 3011. Axle 3010 is rotationally mounted to the frame members 2808 and 2809 by bearings 3053. Drive sprocket 3011 is partially entrained by a drive chain 3012, which is secured at one end 3013 to the rod end 3014 of a pneumatic cylinder 3015, connected by bracket 3018 to the frame member 2808, and at the other end 3016 to a coil spring 3017 which is secured to an ear 3018a attached to the main frame 3001. Thus, the power stroke of the pneumatic cylinder 3015 causes the drive sprocket 3011 to be partially rotated and the coil spring 3017 to be expanded. The return stroke of the pneumatic cylinder 3015, which completes the revolution of the drive sprocket 3011, is assisted by the contraction of the coil spring 3017.

Figure 31:
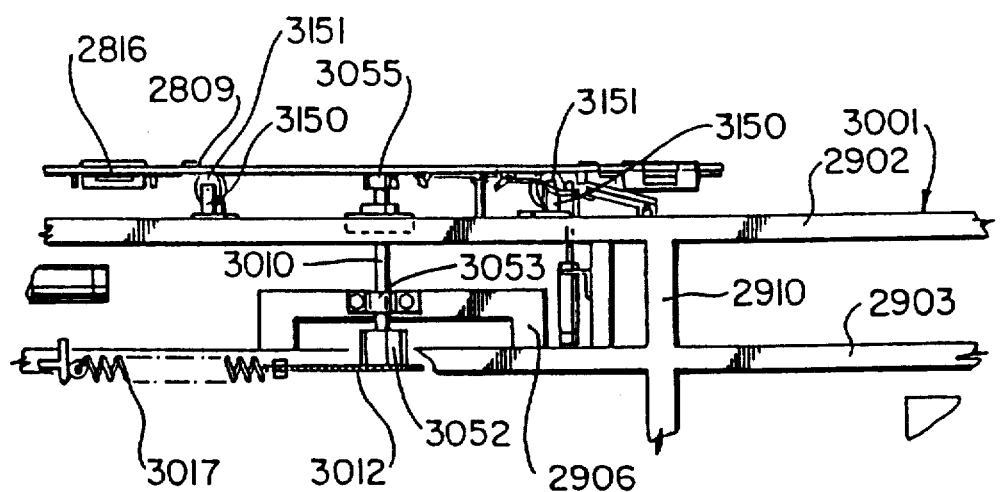
FIG. 31 is a transverse section of the spring drive for the rotary table shown in FIG. 30.

As seen in FIG. 31, the rotary table 2902 is supported by the main frame 3001, the longitudinal beam 2902 of which is provided with a plurality (only two of which being seen) of upstanding ears 3150 within each of which is rotatably mounted a guide wheel 3151. The location of the ears 3150 and guide wheels 3151 is such that the guide wheels 3151 are inboard of the eight hinged receiving and lifting trays 2816 which, in their "at rest" position are just slightly below, but parallel to, the upper surface of the rotary table 2809. These guide wheels 3151 thus provide a suitable support for the rotary table 2809. It is seen, moreover from FIG. 31, that the support shaft 3010 of the rotary table 2809 is supported on bushing block 3052, and then passes through supporting bearings 3053 fixed within support frame 3054 secured to framework 2903 mounted on longitudinal beams 2903. The upper end of shaft 3010 is secured to the underface of the rotary table 2809 at securing bushing 3055.

The dough sheet feeders at STATION A are of the same general construction as the dough sheet feeders specifically described previously with respect to FIGS. 1-5.

The dough sheet loading, unloading and feeding station A includes a pair of identical, rotatable dough trays 2924, which are each divided into a plurality of equal sections, e.g. in quarters, by dividers 3230. Each dough tray 2924 is supported on a shaft 2923 which extends upwardly from the main frame 3001. The shaft 2923 is rotatably mounted between conventional bearings and is driven by an over-ride clutch, intermittently-rotated, chain-driven sprocket, chain drive 2922, which is operated by a pneumatic cylinder drive arrangement, which includes a drive chain 2928 tied to the rod end 2927 of the pneumatic cylinder 2926. These have all been described previously with reference to FIG. 29. Each dough tray 2924 is controlled by means of an indexing means as described with reference to FIG. 4 and a pneumatic cylinder 309, controlled by control box 310, the rod end 311 of which is adapted to abut an associated lug 312 (of four equally-spaced lugs on the bottom of the dough tray 2924), so as to stop the rotation of the dough tray 2924 at an exact predetermined position. To continue the rotation of the dough tray 2924, the rotation drive arrangement is actuated at the same time the rod end 311 is withdrawn from abutment with the lug 312 during the return stroke of the cylinder 309. As soon as the rotation of the dough tray 2924 begins again, the cylinder 309 is actuated to its power stroke to raise the rod end 311 upwardly into contact with the bottom of the dough tray 2924. When the rod end 311 abuts the next lug 312, the rotation of the dough tray 2924 is braked to a stop as the rotation drive arrangement is deactivated.

Each quarter of each dough tray 2923 is loaded, e.g. manually by an operator, with square-shaped sheets of dough, 3201, in quantities of, e.g., eighty.

A support frame 2819 is disposed completely above each of the pair of dough trays 2924. (See FIG. 29) Each support frame 2819 supports a respective transverse guide provided by parallel tracks track 3232, which extend radially inwardly from the centre of the dough tray 2924 to the periphery of the rotary table 2809. A respective carriage 3233 is rollably mounted between associated parallel tracks 3232 of the respective transverse guides on rollers 3234, to enable extending the carriage to the periphery of the rotary table 2809. Each respective carriage 3233 supports a respective vertically-mounted pneumatic cylinder 3235, operated as previously described, the rod ends 3236 of which are fitted with a vacuum pick-up head 3237, operated as previously described. Each pneumatic cylinder 3235 is actuatable to reciprocate its associated rod end 3236 between an upper, at rest, position and a lower, dough sheet pick-up and discharge position. Each respective carriage 3233 is actuatable by means of the rod end 3239 of a pneumatic cylinder 3238 which is fixed to the support frame 2819 to reciprocate the carriage 3233 intermittently in a radial direction.

The square-shaped sheets of dough 3201 which are placed on hinged receiving and lift trays 2816 of the rotary table 2809, are so placed in a particular orientation, e.g. they look like a diamond when viewed from above.

The rotary table 2809 is now partially rotated to the next preset position, and stopped there, with the sheet of dough 3201 at the pepperoni slicing and loading apparatus 2812 at Station B.

The pepperoni slicing and loading apparatus 2812 at STATION B will now be described in the following terms:

The pepperoni slicing and loading apparatus 2812 includes a supporting framework 2819 upon which is mounted an indexing belt feeder 3650, endlessly moved by being entrained around a pair of driven rollers 3651, 3652 which are driven by a double-acting double-rod-end pneumatic indexing cylinder 3653 connected to drive chains 3654, 3655. A power-operated brake flap 3610 is actuated to open (to allow entry of the pepperoni sticks) and to close (to allow gripping of the pepperoni sticks in an upright position) by means of a bar 3613 secured to the rod end 3614 of a pneumatically-operated cylinder 3115, which is secured to a machine frame 3001. The cylinder 3615 is operated by air lines as previously described. A swingable carriage 3621 is mounted on the machine frame 3001. Such swingable carriage 3621 is secured to a pivot rod 3622, which is secured to a plate 3623 mounted on the main frame 3001. The carriage 3621 is adapted to be intermittently swivelled by means of its connection to the rod end 3625 of a pneumatic cylinder 3626.

A slicing arrangement 3630 is secured to the swingable carriage 3621, the slicing arrangement 3630 including a pneumatic motor 3631 which is operable to rotate a cutter blade 3632. The cutting blade 3632 is secured to a rotatable shaft 3634 which is mounted within spaced-apart bushings 3635 secured to the swingable carriage 3621. The cutting blade 3632 is indirectly driven by drive gear 3637 through gearing mechanism gear 3636 which is secured to motor drive shaft 3635, gear 3637 thereby rotating cutter blade shaft 3134. The thickness of the pepperoni sliced by the cutter blade 3632 is controlled by a blade depth gauge plate as previously described with reference to FIGS. 9, 10 and 11.

The rotary table 2809 is now partially rotated to its next preset position, and stopped there, and above-described pepperoni slicing and loading procedure is then repeated when the next sheet of dough 3201 on the next hinged receiving and lift tray 2816 arrives at Station B.

The rotary table 2809 is now stopped at-the cheese slicing and loading apparatus 2813 at STATION C.

The cheese slicing and loading apparatus 2813 at STATION C will now be described in the following terms:

Such cheese slicing and loading apparatus 2813 is supported on framework 2819 upon which is mounted an indexing belt feeder 3850, endlessly moved by being entrained around a pair of driven rollers 3851, 3852 which are driven by a double-acting, double-rod-end pneumatic indexing cylinder 3853, connected to drive chains 3854, 3855. A power operated brake flap 3810 is actuatable to open (to allow entry of the cheese) and to close (to allow gripping of the cheese) by means of a bar 3812 secured to the rod end 3814 of a pneumatically-operated flap cylinder 3815 which is, in turn, secured to the holding tray 3808 mounted on the machine frame 3001. Cylinder 3815 is operated by air lines in the manner previously described.

The actual cheese slicer mechanism is provided by a wire cheese cutter 3823. The wire cheese cutter 3823 is stretched across a cutter assembly 3832, the frame 3833 at its inboard end being attached to the rod end 3825 of a pneumatic cylinder 3826. The cutter assembly 3832 is longitudinally actuatable within an assembly holding frame generally indicated by reference numeral 3834 provided by fore and aft cross pieces and parallel side pieces. The thickness of sliced cheese is set by an adjustable gauge bar 3807.

The rotary table 2809 is now partially rotated to the next preset position and past the egg mixture paste pump 2801 and the tomato paste pump 2801 at STATION D, to stop at folding station.

The egg mixture mixture paste pump 2801 at STATION D and the tomato paste pump 2801 at STATION D are each the same as the similar paste pumps at Station B described heretofore with respect to FIGS. 7A and 7B.

As seen therein, the food paste dispenser pump 650 includes a tank 651 which contains the desired food paste, e.g., tomato paste, or egg mixture paste. Each of the tomato paste dispenser and the egg mixture paste dispenser is provided with such food paste dispenser pump 650. The dispenser pump 650 is connected to a housing 652 via vertical inlet passageway 680. Within housing 652 is a rotary valve 653 and a charging and discharging piston 654. The rotary valve 653 includes a "T"-shaped passage there through provided by a diametrical passageway 655 and an interconnected radial passageway 656. The housing 652 is provided with a horizontal discharge passageway 657 connected to a discharge port 658.

The piston 654 is adapted to be caused to reciprocate in a holding chamber 659, which is connected to rotary valve 653 via vertical connecting passageway 681. The piston 654 is provided with an FDA approved piston seal 660. The piston is pivotally connected by ear 661 to a rod 662, whose free end 663 is pivotally connected to a connecting bar 664. Connecting bar 664 is adapted to be longitudinally driven, by means of a threaded rod 665 passing through tapped longitudinal bore 666 through bar 664 and secured at each end to a framework 667, i.e. to open end 668 and to closed end 669 of framework 667. The position of the bar 664 with respect to rod 665 is fixed by means of set screw lock 670 passing through the floor 671 of framework 667.

Framework 667 is pivotally secured by ear 672 to the main frame 101 connected to framework 667, at transverse pivot pin 673, to the rod end 674 of an air cylinder 675 whose cylinder end 676 is pivotally secured at ear 672 to main frame 101.

In operation, to load the holding chamber 659, the rotary valve 653 is activated by an air cylinder (not shown) to the position shown in FIG. 7A with passageway 655 interconnecting the tank 651 to the holding chamber 659 via vertical inlet passageway 680. The piston 654 is caused to move downwardly (from the position shown in FIG. 7B) in the direction of the "load" arrow flow by means of the return stroke of air cylinder 675, which, by drawing framework 667 downwardly also draws piston 654 downwardly. The amount of downward movement of piston 654, and hence the volume of food paste drawn into holding chamber 659 is controlled by rotation of bar 664 by means of knob 678, thereby moving bar 664. The closer bar 664 is to closed end 669 of framework 667, the less volume of paste is drawn into holding chamber 659.

To dispense the food paste from the holding chamber 659, the rotary valve 653 is actuated by its operating air cylinder (not shown) to the position shown in FIG. 7B where connecting passageway 681 interconnects the holding chamber 659 to the passageways 656 and 657 of the rotary valve 653 and thence to the discharge passageway 657. The air cylinder 675 is then actuated to its power stroke, thereby urging piston 654 upwardly in the direction of the discharge arrow.

Further charging and discharging of the holding chamber 654 takes place by repeating the above described procedure.

The discharge port 658 is connected via feed line 613 or feed line 617 to a specified nozzle situated at folding Station E or at rolling Station F, (respectively). The nozzle is secured to the rod end of a pneumatic cylinder which is adapted, when the pneumatic cylinder is actuated, to dispense a band of food paste along a selected region of the sheet of dough while the sheet of dough is disposed in a defined orientation. In such food production apparatus for the tomato paste pump, a pneumatic cylinder is aligned along the central transverse axis of the diamond-shaped sheet of dough, to dispense a band of tomato paste over the deposited pepperoni and cheese and along a transverse axis of the sheet of dough. In such food production apparatus for the egg mixture paste pump, a pair of pneumatic cylinders is disposed at right angles to one another and such pneumatic cylinders are disposed along the leading edges of the hexagonally-shaped sheet of dough, to dispense a band of, egg mixture paste along each of the desired edges of the hexagonally-shaped, overlapped-folded sheet of dough just prior to the rolling operation.

As noted from the structure of the rotary valve, when the pumping mechanism is operating to dispense tomato paste or egg mixture paste, respectively, from the holding chamber, the entry passageway to the holding chamber is closed. When the pumping mechanism is operating to load food paste into the holding chamber, the discharge passageway therefrom is closed.

As seen in FIG. 28, the tomato paste pump at STATION D has a feed line 613 from its associated dispensing chamber to a tomato paste spreader of the type which is shown in detail in FIG. 34 at folding STATION E. The power stroke of the rod end 3428 of pneumatic cylinder 3427 transversely along a chord of the rotary table 2809 is sufficient to spread the tomato paste from near the lower corner to near the upper corner of the diamond-shaped sheet of dough 3201, i.e. across a long diagonal dimension of the sheet of dough 3201 and on top of the pepperoni and cheese, while the rotary table 2809 is stationary.

As also seen in FIG. 28, the egg mixture paste pumping station has an associated feed line 617 from its associated dispensing chamber to each of two egg mixture spreaders of the type shown in detail in FIG. 35 at the rolling STATION F. Each spreader 3418 is secured at the rod end 3419 of a respective one of two mutually perpendicularly-oriented pneumatic cylinders 3420. The cylinders 3420 are oriented along the lower leading and trailing edges of the hexagonally-shaped, overlapped folded sheet of dough 3201. The power stroke of each of the two egg mixture spreading cylinders 3420 is sufficient to spread the egg mixture across both the entire desired leading and trailing edges of the hexagonally-shaped, overlapped-folded sheet of dough 3201, which is loaded with pepperoni and cheese and which is also overlaid with tomato paste.

The rotary table 2809 has been rotated to its pre-set position where the now loaded sheets of dough 3201 are to be overlapped-folded by the folding mechanism 2815 at STATION E. The above described pepperoni slicing and loading, and cheese slicing and loading procedures are then repeated when the next sheet of dough 3201 on the next hinged receiving and lift tray 2810 arrives at STATIONS B and C.

The preset position is assured by means of a lock and indexing device 3300. Disposed between the STATION D and STATION E, and situated beneath the rotary table 2809, is the lock and indexing device 3300 shown in FIG. 41. This device 3300 includes an indexing lug 4101 below the rotary table 2809 at each of stations A–F. Each such indexing lug 4101 depends from the bottom 4102 of the rotary table 2809. Lug 4101 is adapted to be locked at its upstream face by the upstream end of arm 4103, which is pivoted at 4101 near its downstream end at 4105 to an ear 4106 upstanding from longitudinal beam 2902 of main frame 3001. A pneumatic cylinder 4107 is vertically mounted to an upright 4108 between longitudinal beams 2902 and 2903 of main frame 3001 by means of bracket 4109. The rod end 4110 of pneumatic cylinder 4107 is connected at 4111 to a rod 4112, which is itself encircled by a coil spring 4113 and which pierces a "T"-shaped cam 4114. One end of rod 4112 is secured to cam 4114 by nut 4115. The other end 4116 of the "T"-shaped cam 4114 abuts the bottom of the upstream end of arm 4103. The upright portion 4116 of the "T"-shaped cam 4114 is adapted to lock, by abutment, the other face of the lug 4101.

Figure 42:
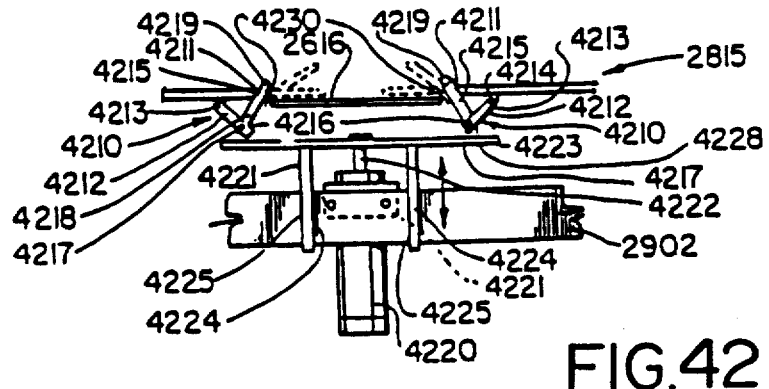
FIG. 42 is a transverse section through a portion of the rotary table showing one embodiment of the dough folding mechanism of this second embodiment of the invention provided by Canadian Patent No. 1,260,318.
Figure 43:
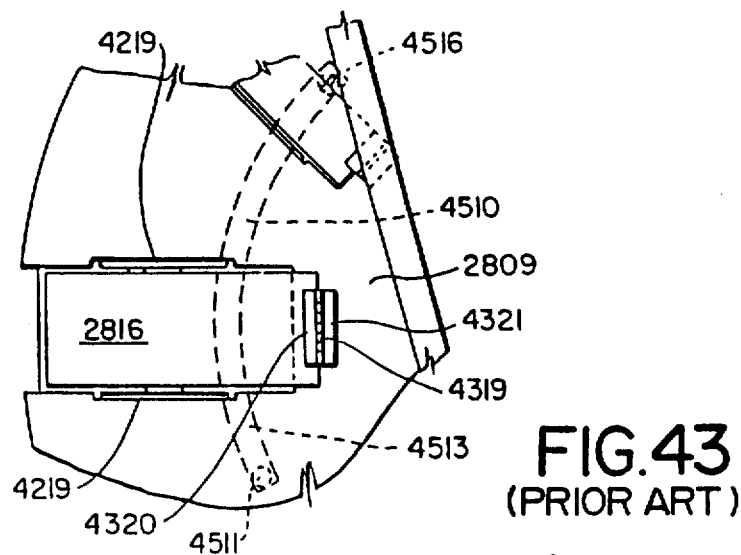
FIG. 43 is a top plan view of one hinged receiving and lift tray with a scroll plate used in its operation shown in phantom.

After the sheet of dough has been loaded with pepperoni and cheese and overcoated with tomato paste, such sheet of dough is operated on by the loaded dough folding apparatus 2815 at STATION E, which will now be described in the following terms:

As shown in FIG. 42, the loaded dough folding apparatus 2815 in this embodiment includes a set of radially-oriented, hinged folding arms 4210, each set comprising a pair of parallel such arms 4210 secured below each radial edge 4211 of each of the eight wells 2817 in the rotary table 2809, each well supporting each a respective hinged receiving and lift tray 2816. The hinged receiving and lift tray 2816, to be further described later, is disposed below, and spaced radially from, radial edges 4211 of well 2817, to provide radial entry slots 4230, for the hinged folding arm 4210. The hinged folding arms 3610 each include an inner arm 4212 hingedly connected at its shoulder end 4213 to an ear 4214 depending from the rotary table 2809 and a folding forearm 4215, hingedly connected at its elbow end 4216 by transverse pivot 4217 to the elbow end 4218 of the inner arm 4212. The outer free ends 4218 of the pair of forearms 4215 are each interconnected by a respective cross rod 4219. The shape of the loaded sheet of dough after folding is a hexagonally-shaped, overlapped folded sheet of dough.

The rotary table 2809 is now partially rotated to its pre-set position where the loaded overlapped-folded hexagonally-shaped sheet of dough 3201 is to be rolled by rolling mechanism 2815 at STATION F. The above described loaded dough sheet folding operation is then repeated when the next loaded sheet of dough 3201 on the next hinged receiving and lift tray 2816 is at STATION E.

Figure 45:
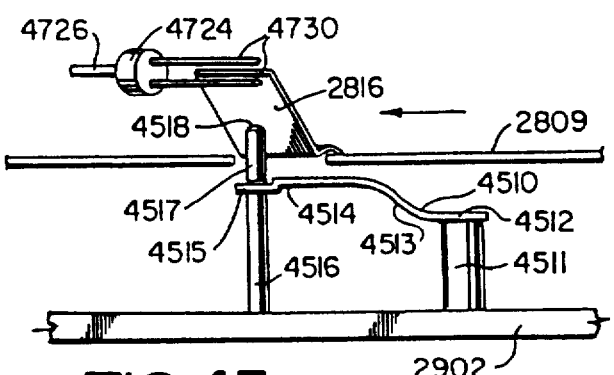
FIG. 45 is a transverse section through the rotary table showing the scroll plate mechanism for raising the hinged receiving and lift tray, and a portion of one embodiment of a rolling apparatus of this second embodiment of the invention provided by Canadian Patent No. 1,260,318.
Figure 49:
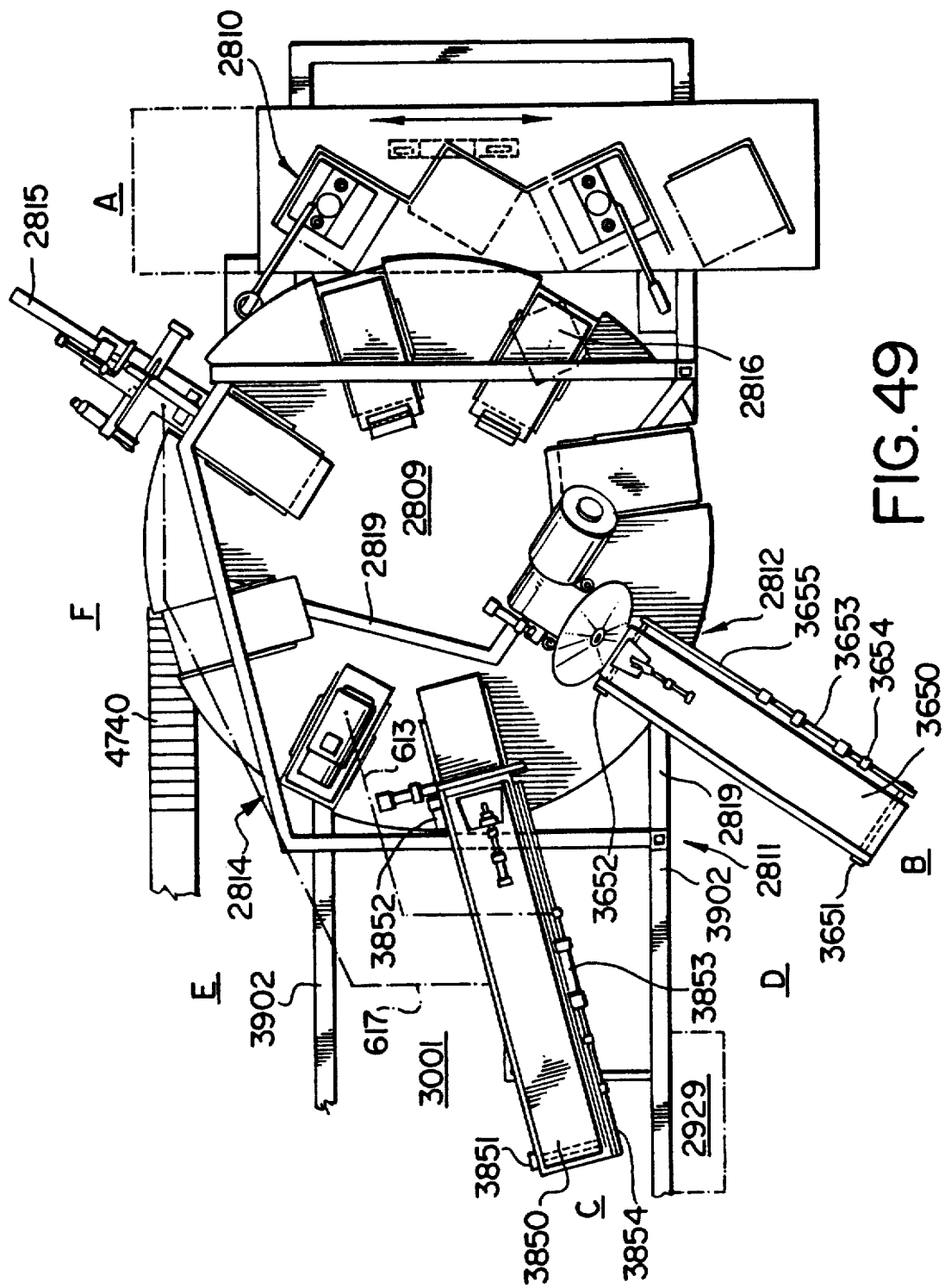
FIG. 49 is a top plan view of the food production apparatus of a third embodiment of this invention, showing a variation of the sheet of dough feeder.
Figure 50:
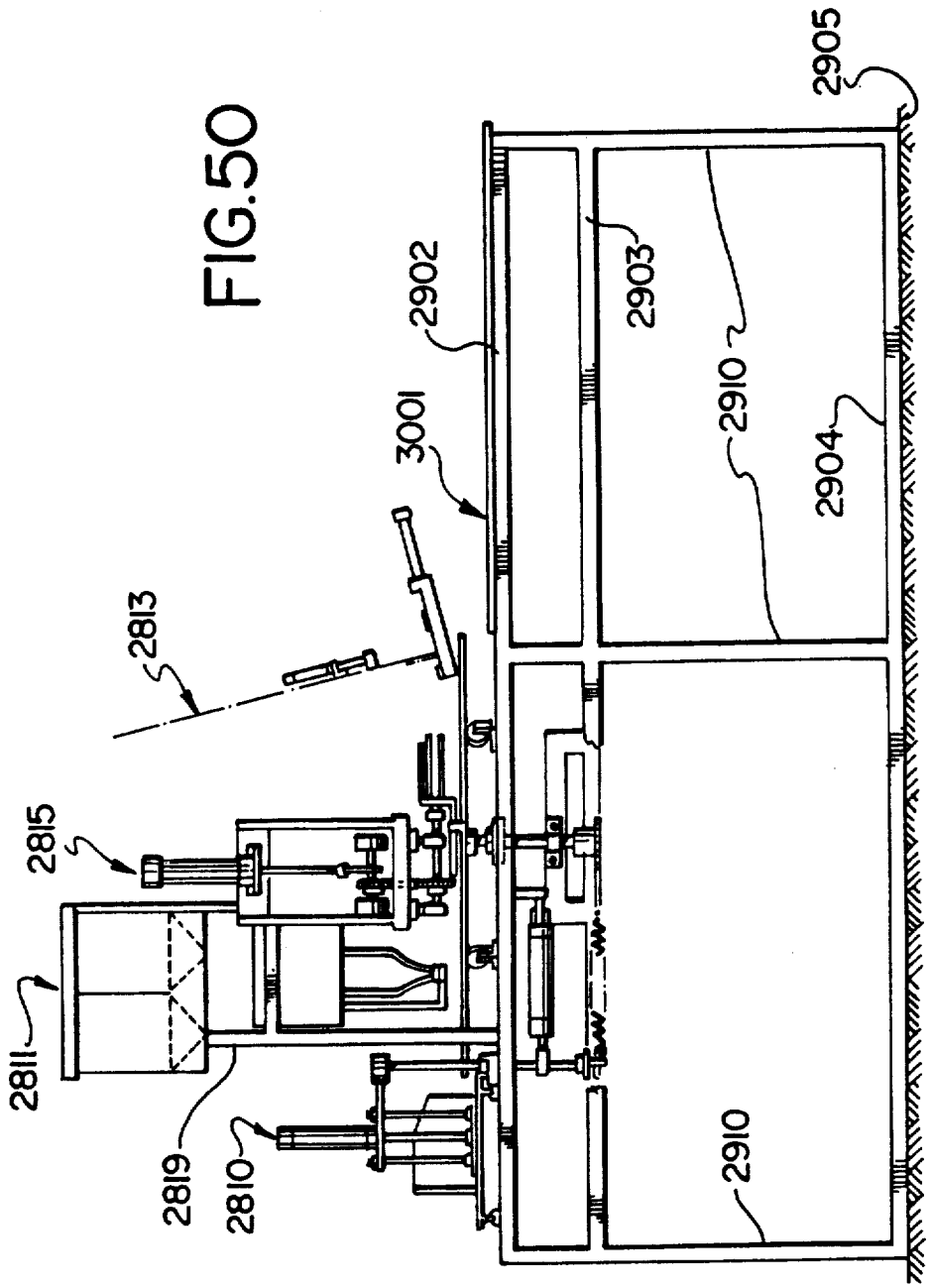
FIG. 50 is a side elevational view of the food production apparatus of the third embodiment of the invention provided by Canadian Patent No. 1,260,318 shown in FIG. 49.

Preparatory to the rolling operation, the overlapped-folded, hexagonally-shaped sheet of dough is coated at the appropriate edges with the egg mixture paste as previously described. In addition, preparatory to the rolling operation, the hinged receiving and lift tray 2816 must be lifted, as follows: As shown in FIGS. 4.3 and 45, a scroll plate 4510 is disposed under STATIONS E and F to raise each hinged receiving and lift tray 2816 to a position (as shown in FIGS. 44 and 45) where the overlapped-folded dough sheet 3201 may be rolled. The scroll plate 4510 is arcuate in plan view, (See FIG. 43) and in elevation (See FIG. 45) includes an upstream post 4511 supporting the upstream end 4512, a gently-upwardly curved mid-portion 4513 and a downstream portion 4514 terminating in a flange 4515. The flange 4515 is supported by an outboard post 4516. Posts 4511 and 4516 are upstanding from longitudinal beam 2902 of main frame 3001. The rotary table 2809 is now stopped at STATION F, so that the rolling mechanism 2815 may be operated. The loaded, folded dough sheet rolling apparatus 2810 at STATION F is similar to the loaded folded dough sheet rolling apparatus previously described and shown in FIGS. 18-21.

Such dough rolling apparatus 2815 includes an upwardly-standing, three-dimensional frame 4701, secured to upstanding framework 2819. Mounted within frame 4701 is a drive mechanism comprising a pair of tandemly-operated, vertically-oriented, pneumatic cylinders 4712, the rod ends 4716 of which each being tied to a chain 4717 which entrains a sprocket 4718. The other end 4714 of chain 4717 is tied to a coil spring 4722 whose other end is secured to ear 4731 mounted on frame 4701. The power stroke of cylinder 4712 causes sprocket 4718 to rotate one half turn and to extend spring 4722. The return stroke of cylinder 4711 is assisted by the return of spring 4722 and this completes the rotation of sprocket 4718. Sprocket 4718 is splined to shaft 4715 to which a speed-reduction sprocket 4719 is also splined. Shaft 4715 is freely rotatably mounted between a pair of spaced-apart bearings 4721. Sprocket 4719 is itself entrained by a second drive chain 4724 which entrains a finger-drive sprocket 4725. Finger drive sprocket 4725 is splined to a shaft 4726 which is freely rotatably mounted between a pair of spaced-apart bearings 4727. The inboard end of the shaft 4726 is provided with a mounting cylinder 4729 fitted with a pair of rolling fingers 4730. A finger unloading cylinder 4738 is mounted by its cylinder end to basket 4736, the rod end 4737 the cylinder 4738 being secured to a rolling guide plate and product discharge 4739.

The rotary table 2809 is now partially rotated to its pre-set position where the empty receiving and lift trays 2816 may be later moved into position to be loaded with a sheet of dough 3201. The above described loaded, folded dough sheet lifting and rolling operations are then repeated when the next loaded, folded sheet of dough 3201 arrives at the next rolling mechanism 2815 at STATION F.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station (not shown here) disposed around the rotary table 2809. STATION F for applying the egg mixture paste to the edges of the overlapped-folded, hexagonally-shaped sheet of dough is still required and operates as previously described.

The remaining stations for folding and rolling the filled product are part of the apparatus as previously described, and are operated in the same fashion as previously described.

A third embodiment of sheet of dough feeder of the food production apparatus of the present invention is shown in FIGS. 49-55. The rotary table 2809 and STATIONS B-F are the same in this third embodiment of the apparatus of the present invention as in the second embodiment of the apparatus of the present invention previously described.

Figure 54:
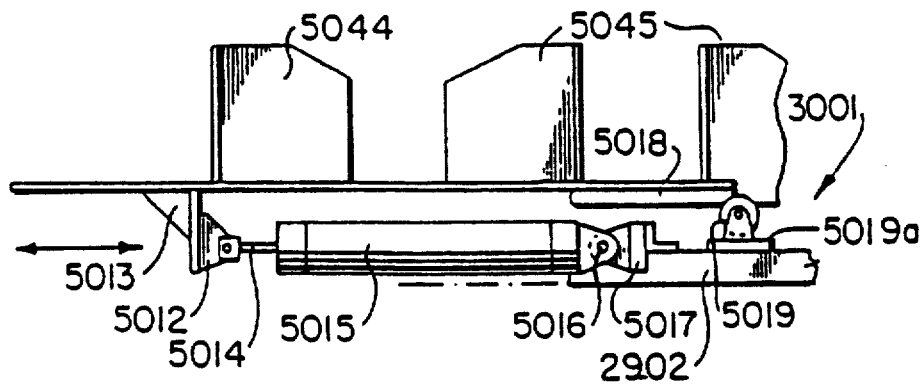
FIG. 54 is a transverse section showing the drive mechanism for the shiftable table of the sheet of dough feeder of the third embodiment of the invention provided by Canadian Patent No. 1,260,318.
Figure 55:
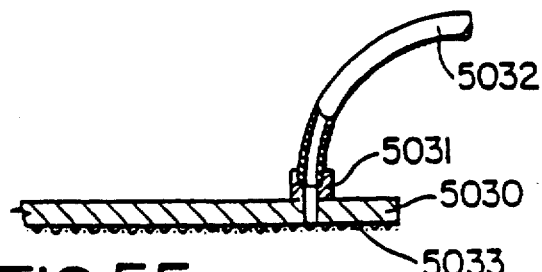
FIG. 55 is a detail of the vacuum shoe of the dough sheet feeder of the third embodiment of the invention provided by Canadian Patent No. 1,260,318.

In this third embodiment, the sheet of dough feeder apparatus 2810 comprises two identical dough sheet feeder mechanisms 5010 mounted above a transversely-shiftable dough tray table 5011. Dough tray table 5011 is reciprocally mounted (see FIG. 54) by having a depending ear 5012 secured at the mid-point of table 5011 by bracket 5013 to the rod end 5014 of a pneumatic cylinder 5015, whose cylinder end 5016 is secured to an ear 5017 fixed to transverse beam 2902 of the main frame 3001. As shown in FIG. 54, the dough tray table 5011 is provided with a depending track 5018 which is supported to roll on rollers 5019 secured by brackets 5020 mounted on transverse beam 2902 of main frame 3001, to enable more smooth and facile transverse reciprocation thereof.

Figure 51:
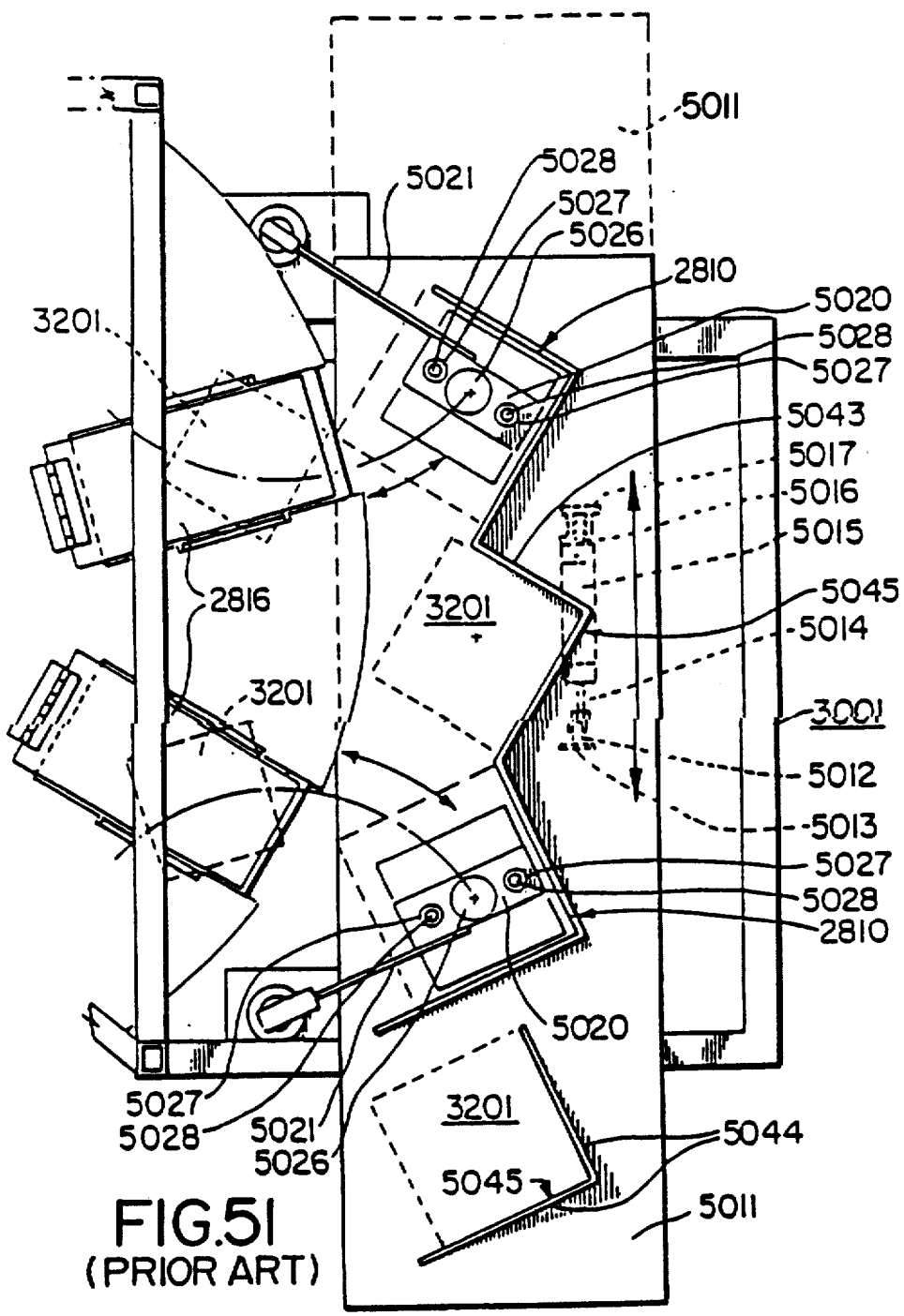
FIG. 51 is a plan view of another embodiment of the dough sheet feeder of the third embodiment of the invention provided by Canadian Patent No. 1,260,318.
Figure 52:
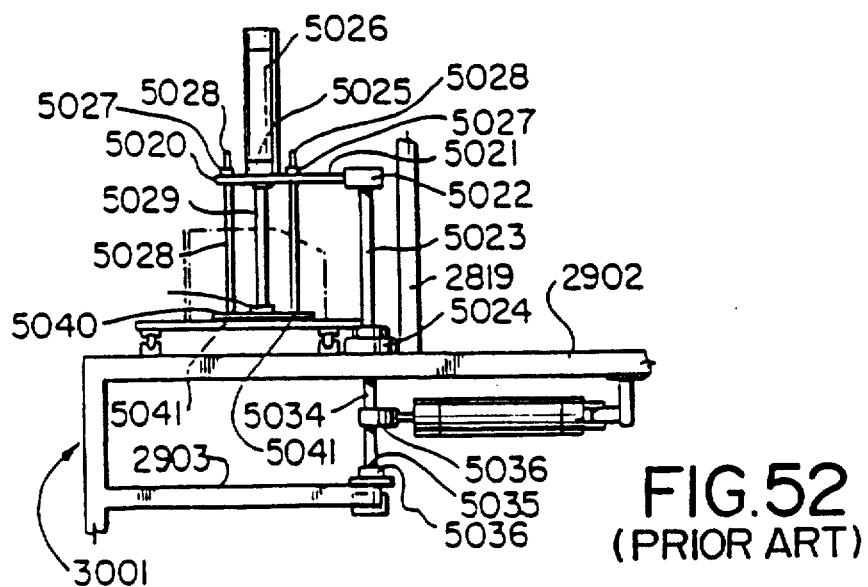
FIG. 52 is a transverse view of the sheet of dough feeder shown in FIG. 51.
Figure 53:
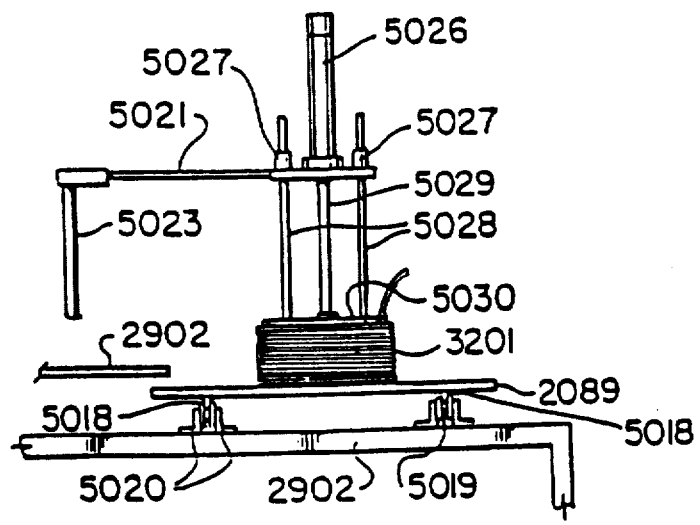
FIG. 53 is a partial side elevational view of the sheet of dough feeder shown in FIG. 51.

As seen in FIGS. 51 and 52, each dough sheet feeder 2810 includes a horizontal plate 5020 connected to at horizontally-cantilevered swing arm 5021 which is swingably and drivably mounted at 5022 within a hollow vertical post 5023, which itself is secured to the transverse beam 2902 of the main frame 3001 at bushing mount 5024. The horizontal plate 5020 supports the cylinder end 5025 of a pneumatic cylinder 5026, as well as the bushings 5027, which are guided by a pair of vertical guide rods 5028. The end 5040 of the rod end 5029 of the pneumatic cylinder 5026 and the ends 5041 of the guide rods 5028 are each fitted with a common vacuum shoe 5030, shown in greater detail in FIG. 54. Vacuum shoe 5030 is connected by fitting 5031 to a vacuum hose 5032. Below the vacuum shoe plate 5030 is a screen 5033 to provide a full surface pick up.

Figure 56:
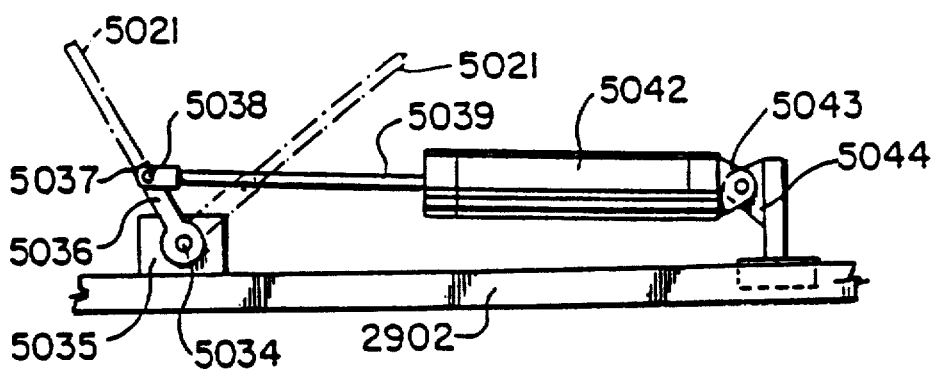
FIG. 56 is a transverse section showing the swing arm drive of the dough sheet feeder of the third embodiment of the invention provided by Canadian Patent No. 1,260,318.

The structure of the swing drive mechanism is more fully shown in FIGS. 51, 52 and 56. The swing arm 5021 is secured to a shaft 5034 whose end 5035 is mounted in bushing 5036 which is fixed to main frame 3001. Below main frame 3001 is a drive mechanism for the swing arm 5021. (shown in FIG. 52), which is secured to shaft 5034 is a drive arm 5036. The end 5037 of drive arm 5036 is secured at 5038 to the rod end 5039 of a pneumatic cylinder 5042. The cylinder end 5043 of pneumatic cylinder 5042 is mounted to a bracket 5044 upstanding from transverse beam 2902 of the main frame 3001.

The-dough tray table 5011 is provided with a pair of spaced-apart trays 5043, bounded by mutually perpendicular walls 5044, 5045 where a stacked supply of sheets of dough 3201, (see FIG. 53) is stored.

Each cylinder 316 is actuatable to reciprocate its associated rod end 318 between an upper position las shown) and a lower, dough sheet pick-up and discharge position. The carriage 315 is actuatable by means of a pneumatic cylinder 321 fixed to the support frame to reciprocate intermittently (as shown by arrow 322) in the following sequence: firstly, over the first dough tray with the first pick up head over the first dough tray while the second pick-up head, to which a sheet of dough is gripped, is over the conveyor with the respective cylinders in their return stroke; then the first pick-up head can be activated to pick-up a sheet of dough, while the second pick-up head can be deactivated to release the dough sheet onto the conveyor; then both pick-up heads are raised, by the associated cylinder in the return stroke, and the pick-up heads are moved transversely (by transverse movement of carriage 315) so that the first pick-up head is now over the conveyor, while the second pick-up head is now over the dough tray; then, the pick-up heads are dropped, by the respective cylinders in their power stroke, so that the first pick-up head is deactivated to release the dough sheet onto the conveyor, while the second pick-up head is activated to pick up a dough sheet; and the procedure is then repeated. The cylinders are synchronized to the same power stroke for the downward movement, and to the same return stroke for upward movement.

The power stroke of the rod end 615 transversely across the conveyor 109 is sufficient to spread the tomato paste from the lower corner to the upper corner of the diamond-shaped sheet of dough, i.e. across the longest dimension of the sheet of dough, while the conveyor 109 is stationary.

The power stroke of each of the two egg mixture spreading cylinders 620 is sufficient to spread the egg mixture across the entire front or leading edges of the diamond-shaped sheet of dough.

The carriage 921/cutter blade 932 are synchronized in the following manner: The three pepperoni sticks rest on the blade depth gauge plate 933 and are gripped by the brake flap 910 to maintain such pepperoni sticks in position. The cutter blade 932 and carriage 921 are then swung on the pivot axis of the rod 922 while the cutter blade is rotating to move the cutter blade 932 across the bottom of the holding tray 909 to slice the three pepperoni sticks at the pre-set thickness. Since the blade depth gauge plate 933 is attached to the carriage 921, the blade depth gauge plate 933 is also moved forwardly along with the cutter blade 932. This allows the three slices of pepperoni to be dropped onto different, discrete areas of the sheet of dough as the swinging travel proceeds. At this time, the sheet of dough is now loaded both with the tomato paste and with the pepperoni slices along its longest transverse axis. The carriage 921 is now swung back to its original position by means of actuating the return stroke of the pneumatic cylinder 926, the brake flap 910 is opened, and the pepperoni sticks then drop down again to rest on the blade depth gauge plate 933. The above-described slicing procedure is then repeated.

The carriage 1222/cutter blade 1223 are-synchronized in operation so that as a slice of cheese is sliced by the blade 1223, it is placed atop the pepperoni on the sheet of dough. The brake flap 1280 is then released, and the cheese block falls down to rest on the thickness-blade adjusting plate 1230. The carriage 1222 is reciprocated back to its "at rest" position. The pneumatic cylinder 1226 operating the blade 1223 is actuated and the carriage 1222 is again reciprocated across the conveyor 109 to allow the sliced piece of cheese to be deposited atop another portion of the pepperoni on the dough.

The hold down cylinders 1505, 1506 are actuated to engage the diamond-shaped sheet of dough 1525 inboard of the upstream and downstream, longitudinal corners but near such diametrically-opposed longitudinal corners and to hold the diamond-shaped sheet of dough 1525 in a stationary position on the conveyor 109. A designated identifying marking stamp (not seen) is also place thereon by the aft plate. Actuation of the pneumatic cylinders 1511, 1512 now causes the fingers, 1517, 1518 which are disposed under the triangular, transverse outboard ends of the foodstuff-covered diamond-shaped sheet of dough to be raised and folded over so that their apices meet and overlap slightly at the centre of the sheet of dough. The sheet of dough is how generally hexagonally-shaped.

In operation, the carriage 1810 is actuated to move laterally over the conveyor 109 by means of pneumatic cylinder 1811. The two fingers 1830 then straddle the lifted-up edge of the dough sheet 1825. The vacuum pad cylinder rod 1832 then releases the vacuum lift-up pad 1833 and retracts. The shaft 1826 is actuated to rotate the fingers 1830 by 2½ turns.

In its operation, a more positive gripping by the fingers is provided by the tilting carriage. The carriage 2201 is tilted out of verticality by swivelling at the swivel bearing 2228 actuated by the rod end of a pneumatic cylinder 2210 in order to have the fingers 2215 tilt downwardly. The rolling operation is the same as previously described. However, to unload the product the carriage is tilted to its vertical orientation.

To roll the overlapped-folded dough sheet, using the rolling finger of FIG. 24, the carriage 2401 is placed with the finger roller 2407, 2408 over the conveyor 109. The outer sleeve 2407 is retracted to expose the wire prongs 2409. Actuation of the rotation mechanism causes the single finger 2407/2408 to rotate and thus to roll the dough sheet by five turns. Now the two-spaced-apart fingers (previously described) constituting an unloading means extend transversely across and over and below the single rolling finger 2407/2408. The outer sleeve 2407 is then retracted, allowing the wire prongs 2409 to release the rolled-up dough sheet. This permits the finger roll to drop onto the conveyor 109. The carriage 2410 is then withdrawn transversely of the conveyor 109. The conveyor 109 then dumps the rolled-up product to another station (not shown) for further processing.

In operation, when the sheet of dough is at the meat loading station, the auger 2618 is actuated to grind the meat. The carriage 2611 is actuated to move in discrete steps across the conveyor 109. At each step, the cutting blade 2623 is actuated to discharge ground meat at a discrete different location on the dough sheet.

Figure 32:
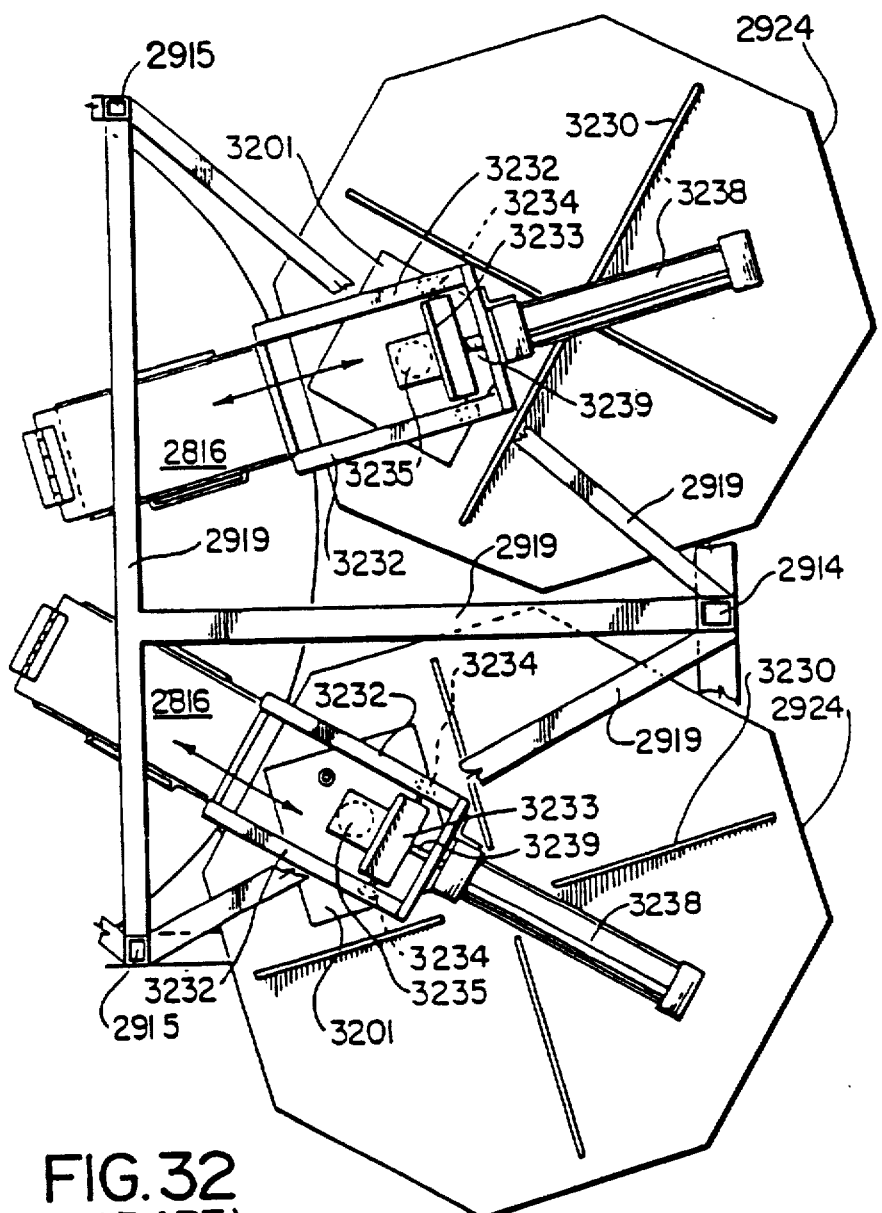
Figure 33:
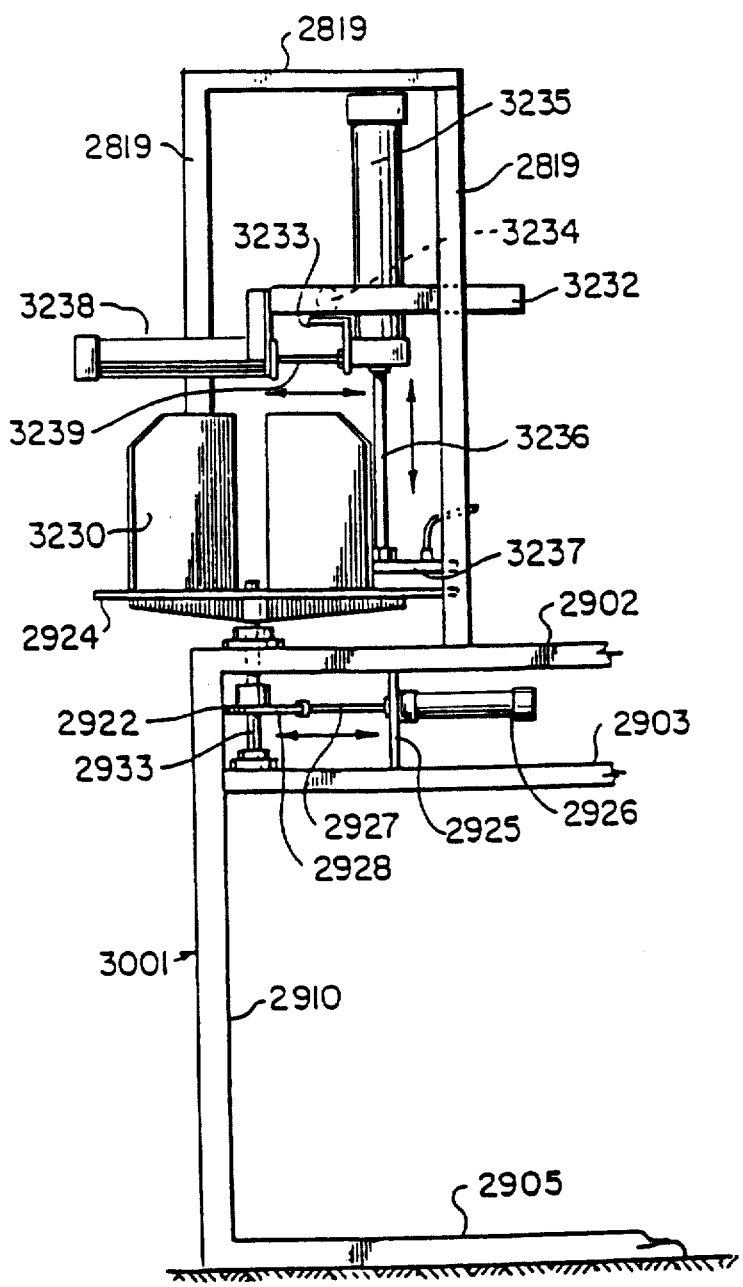
FIG. 33 is a side elevational view of one embodiment of the sheet of dough loading and unloading mechanism of this second embodiment of the invention provided by Canadian Patent No. 1,260,318.
Figure 40:
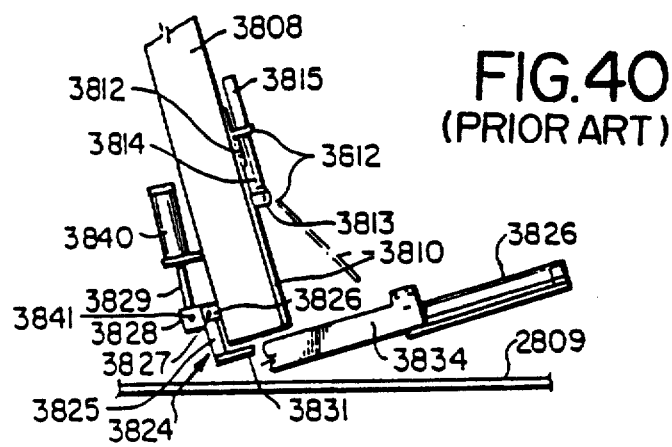
FIG. 40 is a side elevational view of the cheese slicing and loading station shown in FIG. 38.
Figure 41:
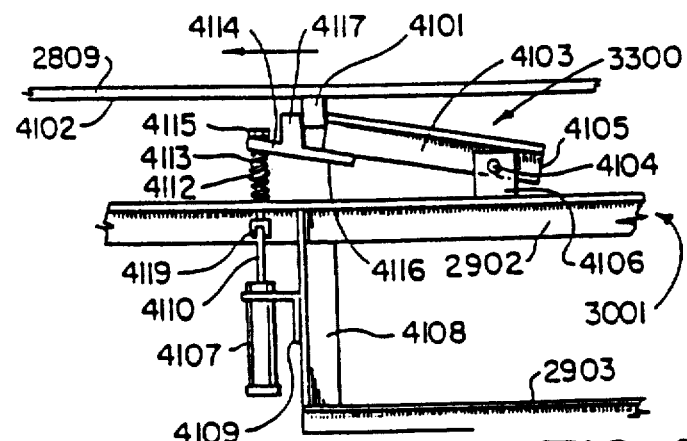
FIG. 41 is a side elevational view of a lock and indexing device of this second embodiment of this invention provided by Canadian Patent No. 1,260,318.

The loading and unloading of the sheets of dough is as follows: Cylinders 3235 are operated in synchronism. Sheets of dough 3201 are stacked-up on the dough trays 2924. Each of cylinders 3235 is actuated to place its respective pick-up head 3237 in contact with one sheet of dough 3201 when the carriage 3233 is in the position as shown in FIG. 32, and the vacuum is actuated, thereby picking up a sheet of dough 3201. The respective pick-up heads 3237 are then moved upwardly by means of the respective cylinder 3235. Then the respective pick-up heads 3237 are moved by movement of respective carriages 3233 through operation of the power stroke of respective cylinders 3238, to a radially-inwardly position over two empty, adjacent, hinged receiving and lift trays 2816. The respective sheets of dough 3801 are then unloaded onto the respective trays 2816 by releasing the vacuum in vacuum pick-up heads 2837. The vacuum pick-up heads 2837 are then returned to their respective upper orientation by the return stroke of respective cylinders 2835, to a position where the sequence is started again. Thus, two sheets of dough 3201 are loaded onto the trays 2816 at the same time.

The operation of carriage 3621/cutter blade 3632 is synchronized in the following manner: The pepperoni sticks have been conveyed by the indexing conveyor and are gripped by the brake flap 3610 to maintain such pepperoni sticks in the appropriate pre-set position. The cutter blade 3632 and carriage 3621 are then swung on the pivot axis of the pivot rod 3622 by actuation of the power stroke of pneumatic cylinder 3626 while the cutter blade 3632 is rotating, thereby to move the rotating cutter blade 3632 across the bottom of the holding tray 3609 to slice the three pepperoni sticks at the thickness which has been pre-set by the depth gauge plate. This allows the three slices of pepperoni to be dropped onto different, discrete areas of the sheet of dough 3201 as the swinging travel proceeds, while the sheet of dough 3201 rests on the receiving and lift tray 2816 which is hingedly secured to the now-stationary rotary table 2809. At this time, the sheet of dough 3201 is now loaded with the pepperoni slices along a long diagonal dimension. The carriage 3621 is now swung back to its original position by means of actuating the return stroke of the pneumatic cylinder 3626, the brake flap 3610 is opened, and the pepperoni sticks are then conveyed again by the indexing conveyor to rest on the blade depth gauge plate at which time the pepperoni sticks are secured in place by the brake flap 3610.

The wire cheese cutter 3823 is reciprocated across the block of cheese to slice the cheese. The cheese is fed to the wire cheese cutter by the indexing conveyor. As each slice of cheese is sliced by the wire cutter 3823 it is placed on a storage tray 3231. Pneumatic cylinder 3826 is operated from an air line as previously described.

When a desired number of slices of cheese have been deposited on the storage tray 3831, the storage tray 3831 is dumped as follows: storage tray 3831 is supported on the vertical arm 3825 of an inverted "L"-shaped control arm 3624, the mid-point of which is pivotally mounted at 3827 to a bracket 3826 secured to the holding tray 3808. The horizontal arm 3828 of the control arm 3824 is connected to the rod end 3839 of a pneumatic cylinder 3840 at pivot 3841. The return stroke of cylinder 3840 pivots the storage tray 3231 in a clockwise direction, thereby dumping the cheese slices.

In the operation of the indexing device for the rotary table, the power stroke and return strokes of the pneumatic cylinder 4107 are coordinated with the rotation of the rotary table 2809 by the pneumatic drive cylinder 3015 as previously described, so that the power stroke of pneumatic cylinder 4107 is accomplished at the precise time when the respective hinged receiving and lift trays 2816 are disposed at the respective STATION when no rotation of the rotary table 2809 is to take place as food processing operations at the respective STATION take place. Then, when the rotary table 2809 is to be rotated, the return stroke of the pneumatic cylinder 4107 takes place, thereby allowing the rotary table 2809 to rotate. The power stroke of the pneumatic cylinder 4107 may then take place at any time prior to when the respective hinged receiving and lift tray 2816 is to be at the next STATION, so as to stop the rotary table 2809 at that STATION.

An operating mechanism for such folding apparatus 2819 is disposed only at STATION F. The operating mechanism includes a pneumatic cylinder 4220, the cylinder end 4221 of which is secured to the longitudinal beam 2902 of the main frame 3001, and whose rod end 4222 is secured to an operating plate 4223. Operating plate 4223 is guided by rods 4224 sliding in bores 4225 in beam 2902. The power stroke of the pneumatic cylinder 4220 urges the operating plate 4223 into engagement with the cam elbow surface 4218 at the hingedly-connected elbow pivot end 4217 of each of the set of folding arms 4210. This causes a two-part motion of the folding forearm arm 4215: firstly to cause the transverse rod 4230 and the folding forearm 4205 to engage the side edges of the loaded dough sheet and to begin to fold the diametrically-opposed ends over towards each other; and secondly, to complete the folding of those edges, i.e. to cause the transverse rod 4230 and the folding forearm 4205 to reverse fold the edges which are beginning to fold to place them atop and overlapping at the central portion of the dough sheet 3201. This action is shown in broken lines.

As the rotary table 2809 rotates, a lifting arm 4517 hingedly-connected at 4518 to the lower face of each hinged receiving and lift tray 2816 (which is hinged by pin 4319 to hinge plate 4320, one plate 4320 of the hinge being secured to tray 2816, the other plate 4321 of the hinge being secured to rotary table 2809) contacts the upstream portion 4512 of the scroll plate 4510. Lifting arm 4517 rides along the mid-portion 4513 of the scroll plate 4510 and, as it does so, it raises the lift tray 2816 until, when the lifting arm 4517 arrives at the flange 4515, the hinged receiving and lift tray 2816 is raised to a precise correct height (as shown). At such height, the sheet of dough 3201 is so oriented that the rolling fingers 4730 can roll the loaded, overlapped-folded, sheet of dough 3201, previously described.

In operation, as the rotary table 2809 rotates the lifting mechanism previously described attached to the underface of the rotary table 2809 is acted upon by the scroll plate 4510 as previously described to raise the hinged receiving and lift tray 2816 also as previously described which also raises the overlapped-folded sheet of dough 3201 resting thereon to the correct predetermined height. The two rolling fingers 4730 then straddle the lifted-up -sheet of dough 3201. To roll the sheet of dough 3201, the finger roller drive mechanism previously described is actuated and the fingers 4730 are caused to rotate 2½ turns. The rolling guide plate 4739 prevents upward movement of the dough sheet. Then the finger unloading cylinder 4738 is actuated to urge the rolling guide plate bracket 4736 against the proximal edges of the rolled dough sheet. This discharges the rolled dough sheet, i.e. the "finger roll" product and deposits it onto the conveyor 4740. The roller guide plate 4739 and the bracket 4736 are then retracted to their initial position, by means of cylinder 4738. Conveyor 4740 feeds the finger roll product to loading trays (not shown) and then to another processing station, e.g., a deep fryer (not shown).

In operation, the dough tray table 5011 is reciprocable to a first position (shown by broken lines) where the vacuum shoes 5030 are disposed over the dough sheet supply trays where sheets of dough 3201 are stacked (as seen in FIG. 52). The pneumatic cylinders 5026 are activated to urge the vacuum shoes 5030 downwardly towards, and to be in contact with, the uppermost dough sheet 3201. When the vacuum is applied, a sheet of dough 3201 is picked up and held by the vacuum shoe 5030. The pneumatic cylinders are then activated to raise the vacuum shoes 5030 upwardly.

The dough tray table 5011 is then reciprocated to a second position (as shown in full lines in FIG. 50), at the precise time when two empty hinged receiving and lift trays 2816 are at the position shown, with the rotary table 2809 stationary. Then each of the swing arms 5021, which are situated in abutting relation to the horizontal plate 5020, is activated to strike the transfer cylinder mechanism 5010 in an arcuate motion until the vacuum shoe 5030 of the dough sheet transfer cylinder mechanism 5010 is over the associated empty hinged receiving and lift tray 2816. The vacuum is disconnected, allowing the previously-held sheet of dough 3201 to fall onto the respective hinged receiving and lift tray 2816. Then the swing arms 5021 are actuated in a reverse arcuate manner to return the respective dough sheet transfer cylinder mechanism 5010 to a position over the shiftable table 5010.

The rotary table 2809 is then rotated and the dough tray table 5011 is also reciprocated to the first position (shown in broken lines), where the dough sheet transfer cylinder mechanism 5010 is actuated to be reloaded, and the operation described above is repeated. Thus, when the two empty hinged receiving and lift trays 2816 are in the position as shown in the drawings, the rotary table 2809 loading cycle can be repeated, to load two hinged receiving lift trays 2816 simultaneously.

Thus the present invention has provided food paste pumps which can readily discharge premeasured volumes of food paste cyclically to a specified location. The combination of two types of food paste pumps in a food production apparatus for making overlapped-folded rolled filled food products provides novel locations for applying the food pastes. The tomato paste is applied over the pepperoni and cheese on a diamond-shaped sheet of dough, while egg mixture paste is applied to folded such sheets of dough, i.e. overlapped-folded, hexagonally-shaped loaded sheets of dough, at edges thereof. The loading of the tomato paste at that location inhibits over-saturation of the sheet of dough to make it soggy, while the loading of the egg mixture paste permits adhesion of the rolled final food products.

What is claimed is:

1. A food paste dispenser comprising:
   a) a main food paste tank;
   b) a holding chamber connected to said main food paste tank;
   c) a rotary valve interconnecting said main food paste tank and said holding chamber, said rotary valve being drivable between a position where it interconnects said holding chamber to said main food paste tank, and a position where it interconnects said holding chamber to a discharge port of said rotary valve;
   d) a piston drivably reciprocal in said holding chamber; and
   e) means for controllably driving said piston downwardly in a loading action to a preset position within said holding chamber, and for drawing said piston upwardly to its full extent to a full discharge position, wherein said means for controllably driving comprises a rod pivotally connected to a framework which is pivotally secured to a main vertical frame member, and an air cylinder whose cylinder end is pivotally secured to said main vertical frame member and whose rod end is pivotally secured to said framework.

2. The food paste dispenser of claim 1 wherein said rotary valve is provided with a "T"-shaped passageway to provide said two interconnecting positions.

3. The food paste dispenser of claim 1 wherein said piston is fitted with a piston seal.

4. The food paste dispenser of claim 1 wherein said pivotal connection is to a bar which is longitudinally movably connected to said framework.

5. The food paste dispenser of claim 4 wherein said bar is threadably connected to a threaded rod extending longitudinally across said framework.

6. The food paste dispenser of claim 5 wherein the position of said bar on said threaded rod is fixable by means of a set screw lock.

7. The food paste dispenser of claim 1 wherein said air cylinder is disposed vertically below said framework.

* * * * *